US008692825B2

(12) United States Patent
Mejdrich et al.

(10) Patent No.: US 8,692,825 B2
(45) Date of Patent: Apr. 8, 2014

(54) PARALLELIZED STREAMING ACCELERATED DATA STRUCTURE GENERATION

(75) Inventors: Eric O. Mejdrich, Woodinville, WA (US); Paul E. Schardt, Rochester, MN (US); Robert A. Shearer, Rochester, MN (US); Matthew R. Tubbs, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 831 days.

(21) Appl. No.: 12/822,427

(22) Filed: Jun. 24, 2010

(65) Prior Publication Data

US 2011/0316855 A1  Dec. 29, 2011

(51) Int. Cl.
*G09G 5/00* (2006.01)

(52) U.S. Cl.
USPC .......................... 345/419; 345/582; 719/315

(58) Field of Classification Search
None
See application file for complete search history.

(56) References Cited

U.S. PATENT DOCUMENTS

| | | | |
|---|---|---|---|
| 4,914,653 A | 4/1990 | Bishop et al. | |
| 5,031,117 A | 7/1991 | Minor et al. | |
| 5,212,789 A | 5/1993 | Rago | |
| 5,537,601 A | 7/1996 | Kimura et al. | |
| 6,021,511 A | 2/2000 | Nakano | |
| 6,088,035 A | 7/2000 | Sudarsky et al. | |
| 6,148,324 A | 11/2000 | Ransom et al. | |
| 6,222,557 B1 | 4/2001 | Pulley, IV et al. | |
| 6,441,817 B1 | 8/2002 | Gossweiler, III et al. | |
| 6,912,716 B1 | 6/2005 | Johanson et al. | |
| 6,933,946 B1 * | 8/2005 | Silva et al. | 345/582 |
| 7,117,502 B1 * | 10/2006 | Harris | 719/315 |
| 7,142,709 B2 | 11/2006 | Girard | |
| 7,164,420 B2 | 1/2007 | Ard | |
| 7,385,607 B2 | 6/2008 | Bastos et al. | |
| 7,477,999 B2 | 1/2009 | Wegener | |
| 7,796,835 B2 | 9/2010 | Matsumoto | |
| 7,808,500 B2 | 10/2010 | Shearer | |
| 7,830,379 B2 | 11/2010 | Peterson et al. | |
| 7,856,534 B2 | 12/2010 | Van Doren et al. | |
| 7,973,804 B2 | 7/2011 | Mejdrich et al. | |
| 7,978,205 B2 | 7/2011 | Patel et al. | |
| 8,195,859 B2 | 6/2012 | Le Moal | |
| 8,248,401 B2 | 8/2012 | Fowler et al. | |
| 8,248,412 B2 | 8/2012 | Fowler et al. | |

(Continued)

OTHER PUBLICATIONS

Wald, Ingo, Carsten Benthin, and Philipp Slusallek. "A Flexible and Scalable Rendering Engine for Interactive 3D Graphics." Computer Graphics Group, Saarland University (2002).*

(Continued)

*Primary Examiner* — Daniel Hajnik
*Assistant Examiner* — Sultana M Zalalee
(74) *Attorney, Agent, or Firm* — Toler Law Group

(57) ABSTRACT

A method includes receiving at a master processing element primitive data that includes properties of a primitive. The method includes partially traversing a spatial data structure that represents a three-dimensional image to identify an internal node of the spatial data structure. The internal node represents a portion of the three-dimensional image. The method also includes selecting a slave processing element from a plurality of slave processing elements. The selected processing element is associated with the internal node. The method further includes sending the primitive data to the selected slave processing element to traverse a portion of the spatial data structure to identify a leaf node of the spatial data structure.

12 Claims, 8 Drawing Sheets

(56) References Cited

U.S. PATENT DOCUMENTS

| | | | |
|---|---|---|---|
| 8,332,452 B2 | 12/2012 | Mejdrich et al. | |
| 8,341,611 B2 | 12/2012 | Munshi et al. | |
| 8,405,670 B2 | 3/2013 | Mejdrich et al. | |
| 8,522,254 B2 | 8/2013 | Hickey et al. | |
| 2003/0037117 A1 | 2/2003 | Tabuchi | |
| 2003/0038798 A1 | 2/2003 | Besl et al. | |
| 2003/0169269 A1 | 9/2003 | Sasaki et al. | |
| 2004/0021768 A1 | 2/2004 | Payne et al. | |
| 2004/0125103 A1 | 7/2004 | Kaufman et al. | |
| 2006/0010449 A1 | 1/2006 | Flower et al. | |
| 2006/0066607 A1 | 3/2006 | Schmittler et al. | |
| 2006/0104545 A1 | 5/2006 | Matsumoto | |
| 2006/0149804 A1 | 7/2006 | Luick et al. | |
| 2006/0152519 A1 | 7/2006 | Hutchins et al. | |
| 2007/0018980 A1 | 1/2007 | Berteig et al. | |
| 2007/0079161 A1 | 4/2007 | Gupta | |
| 2007/0091089 A1 | 4/2007 | Jiao et al. | |
| 2008/0024489 A1* | 1/2008 | Shearer | 345/421 |
| 2008/0028403 A1 | 1/2008 | Hoover et al. | |
| 2008/0043018 A1 | 2/2008 | Keller et al. | |
| 2008/0049016 A1 | 2/2008 | Shearer | |
| 2008/0049017 A1 | 2/2008 | Shearer | |
| 2008/0074417 A1 | 3/2008 | Mejdrich et al. | |
| 2008/0074420 A1 | 3/2008 | Kuesel et al. | |
| 2008/0079713 A1 | 4/2008 | Mejdrich et al. | |
| 2008/0079714 A1 | 4/2008 | Shearer | |
| 2008/0079715 A1* | 4/2008 | Shearer | 345/419 |
| 2008/0094410 A1 | 4/2008 | Jiao et al. | |
| 2008/0122838 A1* | 5/2008 | Hoover et al. | 345/420 |
| 2008/0122853 A1 | 5/2008 | Brown et al. | |
| 2008/0150944 A1 | 6/2008 | Reshetov et al. | |
| 2008/0158228 A1 | 7/2008 | Fossum et al. | |
| 2008/0180441 A1 | 7/2008 | Brown et al. | |
| 2008/0183791 A1 | 7/2008 | Ho et al. | |
| 2008/0192051 A1 | 8/2008 | Fowler et al. | |
| 2008/0192063 A1 | 8/2008 | Liao et al. | |
| 2008/0260283 A1* | 10/2008 | Ivansen et al. | 382/266 |
| 2009/0083357 A1 | 3/2009 | Muff et al. | |
| 2009/0125574 A1 | 5/2009 | Mejdrich et al. | |
| 2009/0167763 A1* | 7/2009 | Waechter et al. | 345/426 |
| 2009/0187734 A1 | 7/2009 | Mejdrich et al. | |
| 2009/0201302 A1 | 8/2009 | Hoover et al. | |
| 2009/0231349 A1 | 9/2009 | Mejdrich et al. | |
| 2009/0256836 A1* | 10/2009 | Fowler et al. | 345/419 |
| 2009/0262132 A1 | 10/2009 | Peterson et al. | |
| 2009/0282222 A1 | 11/2009 | Hoover et al. | |
| 2009/0282419 A1 | 11/2009 | Mejdrich et al. | |
| 2009/0295805 A1 | 12/2009 | Ha et al. | |
| 2010/0073370 A1 | 3/2010 | McCombe et al. | |
| 2011/0018884 A1 | 1/2011 | Ritts et al. | |
| 2011/0090225 A1 | 4/2011 | Twilleager | |
| 2011/0285709 A1 | 11/2011 | Mejdrich et al. | |
| 2011/0285710 A1 | 11/2011 | Mejdrich et al. | |
| 2011/0298788 A1 | 12/2011 | Hickey et al. | |
| 2011/0316864 A1 | 12/2011 | Mejdrich et al. | |
| 2011/0321049 A1 | 12/2011 | Hickey et al. | |
| 2011/0321057 A1 | 12/2011 | Mejdrich et al. | |
| 2012/0209944 A1 | 8/2012 | Mejdrich et al. | |
| 2013/0044117 A1 | 2/2013 | Mejdrich et al. | |
| 2013/0046518 A1 | 2/2013 | Mejdrich et al. | |

OTHER PUBLICATIONS

Yang, Xin, Duan-qing Xu, and Lei Zhao. "Ray Tracing Dynamic Scenes using fast KD-tree Base on Multi-Core Architectures." Computer Science and Software Engineering, 2008 International Conference on. vol. 2. IEEE, 2008.*

Catalyurek, Umit V., et al. "A repartitioning hypergraph model for dynamic load balancing." Journal of Parallel and Distributed Computing 69.8 (2009): 711-724.*

Flaherty, Joseph E., et al. "Adaptive local refinement with octree load balancing for the parallel solution of three-dimensional conservation laws." Journal of Parallel and Distributed Computing 47.2 (1997): 139-152.*

Wald, Ingo, Carsten Benthin, and Philipp Slusallek. "Distributed interactive ray tracing of dynamic scenes." Parallel and Large-Data Visualization and Graphics, 2003. PVG 2003. IEEE Symposium on. IEEE, 2003.*

Stolte, Nilo, and Ari Kaufman. "Parallel spatial enumeration of implicit surfaces using interval arithmetic for octree generation and its direct visualization." Implicit Surfaces' 98. 1998.*

U.S. Appl. No. 12/794,207; Final Office Action dated Jun. 26, 2013; 35 pages.

U.S. Appl. No. 12/794,207; Non-Final Office Action dated Jan. 15, 2013; 27 pages.

U.S. Appl. No. 12/794,207; Notice of Allowance dated Sep. 9, 2013; 11 pages.

U.S. Appl. No. 12/823,745; Final Office Action dated Jan. 4, 2013; 18 pages.

U.S. Appl. No. 12/823,745; Non-Final Office Action dated Aug. 28, 2012; 15 pages.

U.S. Appl. No. 12/823,745; Notice of Allowance dated Apr. 24, 2013; 11 pages.

U.S. Appl. No. 12/784,522; Final Office Action dated Aug. 31, 2012; 19 pages.

U.S. Appl. No. 12/784,522; Non-Final Office Action dated Apr. 26, 2012; 17 pages.

U.S. Appl. No. 12/784,522; Non-Final Office Action dated Jan. 9, 2013; 19 pages.

U.S. Appl. No. 12/784,522; Notice of Allowance dated Jul. 8, 2013; 8 pages.

U.S. Appl. No. 12/784,525; Final Office Action dated Mar. 22, 2013; 43 pages.

U.S. Appl. No. 12/784,525; Non-Final Office Action dated Oct. 12, 2012; 40 pages.

U.S. Appl. No. 12/784,525; Notice of Allowance dated Aug. 16, 2013; 12 pages.

Benthin, C. et al., "Ray Tracing on the Cell Processor", IEEE Symposium on Interactive Ray Tracing 2006, Sep. 2006, IEEE Computer Society, Piscataway, NJ, pp. 15-23.

Boulos, S. et al., "Packet-based Whitted and Distribution Ray Tracing", GI '07 Proceedings of Graphics Interface 2007, May 2007, ACM, New York, NY, pp. 177-184.

Dachille, F. et al., "GI-Cube: An Architecture for Volumetric Global Illumination and Rendering", HWWS'00, Proceedings of the ACM SIGGRAPH/EUROGRAPHICS workshop on Graphics hardware, 2000, ACM, New York, NY, pp. 119-128.

Flaherty, J. et al., "Adaptive local refinement with octree load-balancing for the parallel solution of three-dimensional conservation laws", Journal of Parallel and Distributed Computing, vol. 47, Issue 2, 1997, Elsevier, Inc., pp. 139-152.

Flaherty, J., et al., "Distributed Octree Data Structures and Local Refinement Method for the Parallel Solution of Three-Dimensional Conservation Laws", Grid Generation and Adaptive Algorithms, 1999, Springer, pp. 113-134.

Gath, J., "Derivation of the Tangent Space Matrix", Retrieved from <<http://www.blacksmith_studios.dk/projects/downloads/tangent_matrix_derivation.php>>, 2006, Blacksmith Studios, pp. 1-8.

Govindaraju, V. et al., "Toward a Multicore Architecture for Realtime Ray-tracing", Proceedings of the 41st Annual IEEE/ACM International Symposium on Microarchitecture, 2008, IEEE Computer Society, Washington, DC, pp. 176-187.

Hook, D., "Algorithms for Accelerating Ray Tracing", PhD Dissertation, University of Melbourne, May 29, 1995, 121 pages.

Hunt, W. et al., "Adaptive Acceleration Structures in Perspective Space", IEEE Symposium on Interactive Ray Tracing, Aug. 2008, IEEE, Piscataway, NJ, pp. 11-17.

Hunt, W. et al., "Fast and Lazy Build of Acceleration Structures from Scene Hierarchies", IEEE Symposium on Interactive Ray Tracing, Sep. 2007, IEEE, Piscataway, NJ, pp. 47-54.

Hunt, W. et al., "Ray-Specialized Acceleration Structures for Ray Tracing", IEEE/EG Symposium on Interactive Ray Tracing, Aug. 2008, IEEE, Piscataway, NJ, pp. 3-10.

Ize, T. et al., "Asynchronous BVH Construction for Ray Tracing Dynamic Scenes on Parallel Multi-Core Architectures", Proceedings of the 2007 Eurographics Symposium on Parallel Graphics and Visualization, 2007, 8 pages.

(56) References Cited

OTHER PUBLICATIONS

Ize, T. et al., "Asynchronous BVH Construction for Ray Tracing Dynamic Scenes", Scientific Computing and Imaging Institute, University of Utah, Nov. 13, 2006, 8 pages.

Lauterbach, C. et al., "RT-DEFORM: Interactive Ray Tracing of Dynamic Scenes using BVHs", Proceedings of the 2006 IEEE Symposium on Interactive Ray Tracing, Sep. 2006, IEEE Computer Society, Piscataway, NJ, pp. 39-45.

Levoy, M. et al., "Gaze-Directed volume Rendering", ACM SIGGRAPH Computer Graphics, vol. 24, Issue 2, Mar. 1990, ACM, New York, NY, pp. 217-223.

Lin, T. et al., "Stochastic Ray Tracing Using SIMD Processor Arrays", The Visual Computer, vol. 7, No. 4, Jul. 1991, Springer-Verlag, pp. 187-199.

Oh, D. et al., "Utilization Bounds for N-Processor Rate Monotone Scheduling with Static Processor Assignment", Real-Time Systems, vol. 15, Issue 2, Sep. 1998, Kluwer Academic Publishers, pp. 183-192.

Ohshima, T. et al., "Gaze-Directed Adaptive Rendering for Interacting with Virtual Space", VRAIS '96, Proceedings of the 1996 Virtual Reality Annual International Symposium, 1996, IEEE Computer Society, Washington, DC, pp. 103-111.

Sevre, E. et al., "Experiments in scientific computation on the Playstation 3", Visual Geosciences, vol. 13, No. 1, Jul. 2008, Springer-Verlag, pp. 125-132.

Stoll, G. et al., "Razor: An Architecture for Dynamic Multiresolution Ray Tracing", University of Texas at Austin, Department of Computer Sciences Technical Report #TR-06-21, Apr. 26, 2006, University of Texas, Austin, pp. 1-12.

Van Heesch, F., "3D-Graphics Rendering on a Multi-Processor Architecture", Master's Thesis, The Faculty of Electrical Engineering, Eindhoven University of Technology, Mar. 2003, 78 pages.

Wald, I. et al., "State of the Art in Ray Tracing Animated Scenes", STAR Proceedings of Eurographics, Sep. 2007, The Eurographics Association, Prague, Czech Republic, pp. 89-116.

Wald, I. et al., "Interactive Rendering with Coherent Ray Tracing", Computer Graphics Forum, vol. 20, No. 3, 2001, Blackwell Publishers, Malden, MA, pp. 153-164.

Wald, I., "On Fast Construction of SAH-based Bounding Volume Hierarchies", IEEE Symposium on Interactive Ray Tracing, Sep. 2007, IEEE, Piscataway, NJ, pp. 33-40.

Woop, S. et al., "RPU: A Programmable Ray Processing Unit for Realtime Ray Tracing", ACM Transactions on Graphics—Proceedings of ACM SIGGRAPH 2005, vol. 24, Issue 3, Jul. 2005, ACM, New York, NY, pp. 434-444.

Xue, D., "Volume Visualization Using Advanced Graphics Hardware Shaders", PhD Thesis, Department of Computer Science and Engineering, The Ohio State University, 2008, 143 pages.

Yagel, R. et al., "Priority-driven Ray Tracing", The Journal of Visualization and Computer Animation, vol. 8, 1997, John Wiley & Sons, Ltd., pp. 17-32.

Zongker, D. et al., "Environment Matting and Compositing", SIGGRAPH '99, Proceedings of the 26th Annual Conference on Computer Graphics and Interactive Techniques, 1999, ACM Press/Addison-Wesley Publishing Co., New York, NY, pp. 205-214.

\* cited by examiner

PARALLELIZED STREAMING ACCELERATED DATA STRUCTURE GENERATION

I. FIELD OF THE DISCLOSURE

The present disclosure relates generally to image processing, and more specifically, to parallelized ray tracing of a three-dimensional image.

II. BACKGROUND

Ray tracing is a computer-based technique that may be used for creating photorealistic computer graphics in video game animation, motion pictures, and other media applications. In ray tracing, paths ("rays") connecting light sources to objects are identified and summed. Rays are traced along a line of sight to determine visibility and from light sources to determine illumination.

A ray generally originates at a point in space described by a position vector and travels along a direction vector. Ray tracing may be used to determine visibility by directing the ray from the origin along a line of sight described by the direction vector. The ray is tested for intersection against objects within a virtual scene to determine the nearest visible surface along that line of sight. Ray tracing can generate an image by tracing the ray through pixels in a plane. Ray tracing is capable of producing a very high degree of photorealism, usually higher than that of other rendering methods. Ray tracing is capable of simulating a wide variety of optical effects such as reflection and refraction, as well as scattering and chromatic aberration. Scenes created using ray tracing may incorporate data from images or models captured by digital photography.

In ray tracing, a single spatial data structure, such as a tree structure, may be used to represent the image of a particular frame. To avoid having two or more processing elements simultaneously attempt to modify the spatial data structure, ray tracing techniques are usually implemented using serial algorithms in which the steps of the algorithm are performed one after another. For this reason, current ray tracing techniques may not be able to take advantage of multiple core processors that can process many steps in parallel.

III. SUMMARY OF THE DISCLOSURE

In a particular embodiment, a method includes receiving at a master processing element primitive data that includes properties of a primitive. The method includes partially traversing a spatial data structure that represents a three-dimensional image to identify an internal node of the spatial data structure. The internal node represents a portion of the three-dimensional image. The method also includes selecting a slave processing element from a plurality of slave processing elements. The selected processing element is associated with the internal node. The method further includes sending the primitive data to the selected slave processing element to traverse a portion of the spatial data structure to identify a leaf node of the spatial data structure.

In another particular embodiment, a computer program product including a non-transitory computer usable medium having computer usable program code embodied therewith. The computer usable program code is further executable by a processor to receive, at a slave processing element, primitive data and a request from a master processing element to identify a leaf node that is associated with a location of a primitive in a three-dimensional image. The primitive data includes properties of the primitive. The computer usable program code is further executable by the processor to partially traverse a spatial data structure that represents the three-dimensional image. The partial traversal is based on the location of the primitive in the three-dimensional image. When the leaf node is encountered while traversing the spatial data structure, the computer usable program code is further executable by the processor to determine whether the primitive data can be inserted into the leaf node. The computer usable program code is further executable by the processor to send a path to the leaf node to the master processing element when the primitive data can be inserted into the leaf node.

In another particular embodiment, a system includes a master processing element operable to receive primitive data comprising properties of a primitive. The master processing element is operable to partially traverse a spatial data structure that represents a three-dimensional image to identify an internal node of the spatial data structure. The master processing element is further operable to select from a plurality of slave processing elements a slave processing element associated with the internal node. The master processing element is further operable to send the primitive data to the selected slave processing element. The selected slave processing element traverses a portion of the spatial data structure to identify a leaf node of the spatial data structure.

These and other advantages and features that characterize embodiments of the disclosure are set forth in the claims annexed hereto and forming a further part hereof. However, for a better understanding of the disclosure, and of the advantages and objectives attained through its use, reference should be made to the drawings and to the accompanying descriptive matter in which there are described exemplary embodiments of the disclosure.

IV. BRIEF DESCRIPTION OF THE DRAWINGS

V. DETAILED DESCRIPTION

Figure 1:
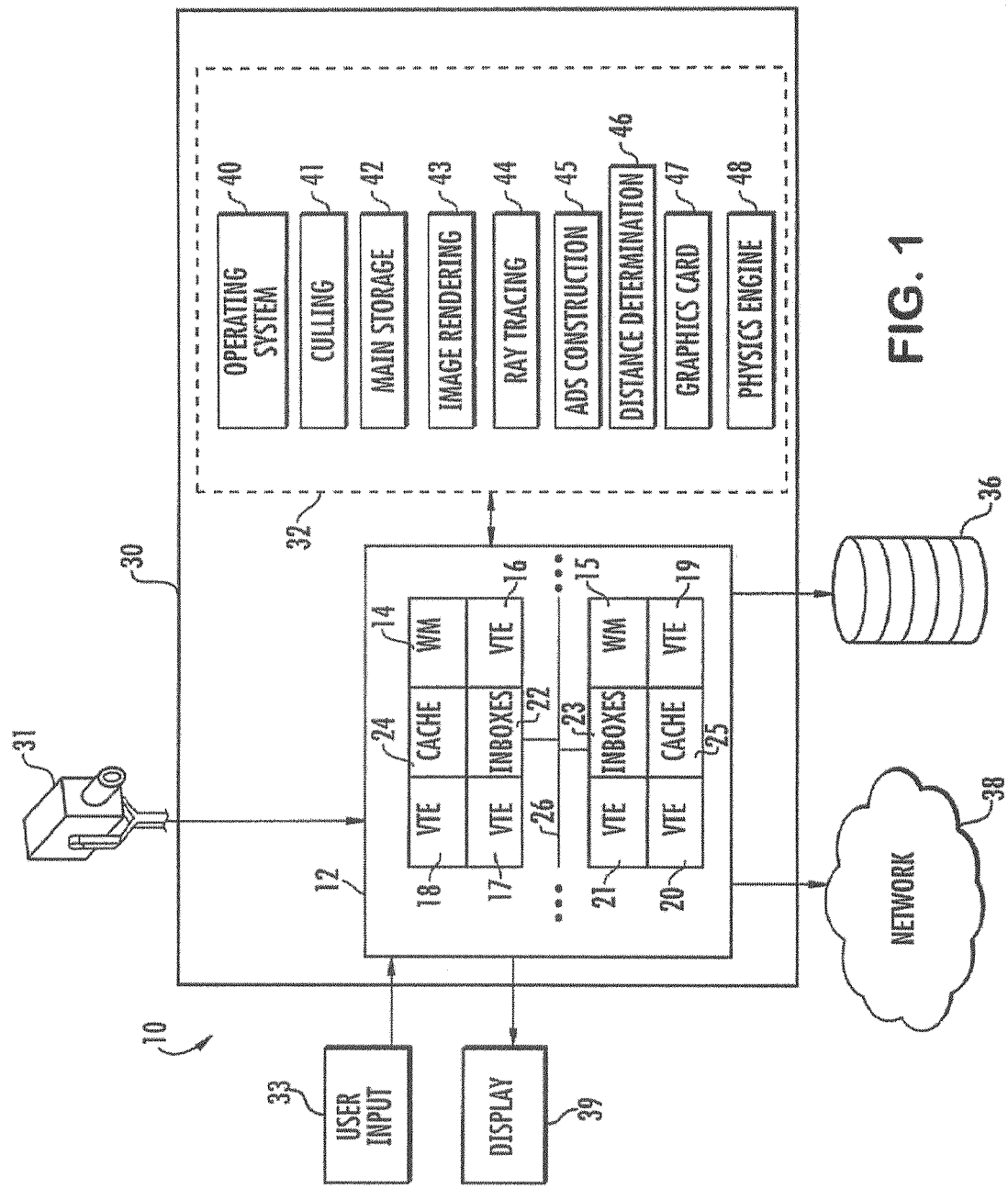
FIG. 1 is a first block diagram of a system to construct a spatial data structure.

Ray tracing describes a technique for synthesizing photorealistic images by identifying and summing paths ("rays") that connect light sources to a camera. In ray tracing, rays may be traced along a line of sight to determine visibility and may be traced from light sources to determine illumination. A ray may originate at a point in space described by a position vector and may travel along a direction vector. In ray tracing, to determine visibility, the ray may be sent from the origin along a line of sight described by the direction vector. The ray may be tested for intersection against objects within a three-dimensional image to determine the nearest visible object along that line of sight. Ray tracing may generate an image by tracing the ray through individual pixels of the objects in the three-dimensional image.

When rendering a three-dimensional image, a graphics system may initially create a spatial data structure that represents the three-dimensional image. The spatial data structure may be created by recursively subdividing the three-dimensional image into smaller portions, called bounding volumes. The graphics system may add nodes to the spatial data structure based on the bounding volumes of the three-dimensional image. For example, each node of the spatial data structure may correspond to a bounding volume of the three-dimensional image. To represent the objects located in the three-dimensional image, the graphics system may use geometric primitives as building blocks to depict each object. The graphics system may add primitive data structures that represent the primitives to the spatial data structure. After adding the primitive data structures to the spatial data structure, the graphics system may use ray data structures that represent rays of light providing illumination in the three-dimensional image. The graphics system may trace a path of each ray to determine whether the ray intersects any of the primitives in the three-dimensional image using the ray data structure (that represents the ray) and the spatial data structure that includes the primitive data structures (that represent the primitives). In this disclosure, the terms "ray" and "ray data structure" may interchangeably be used to refer to a ray in a three-dimensional image, as well as a ray data structure that represents the ray. The terms "primitive" and "primitive data structure" may be used to refer to a primitive of an object in a three-dimensional image, as well as a primitive data structure that represents the primitive. Thus, "tracing a ray to determine an intersection of the ray with a primitive" may refer to performing calculations using the ray data structure (that represents the ray) and using the primitive data structures (that represent the primitives).

In ray tracing, a three-dimensional image may be represented mathematically using a spatial data structure. For example, a k-dimensional tree (kd-tree), a type of binary tree, may be used as a spatial data structure to represent a three-dimensional image. The spatial data structure may be referred to as an accelerated data structure (ADS), because the spatial data structure can be built and traversed relatively quickly.

When rendering a three-dimensional image, a graphics generation system may initially create a spatial data structure that corresponds to the three-dimensional image. The spatial data structure may be created by recursively subdividing the three-dimensional image into smaller portions (e.g., cubes), called bounding volumes. The graphics generation system may add nodes to the spatial data structure based on the bounding volumes of the three-dimensional image. For example, one or more nodes of the spatial data structure may correspond to particular bounding volumes of the three-dimensional image. To represent objects located in the three-dimensional image, the graphics generation system may use geometric primitives as building blocks for depicting the objects. The graphics generation system may add primitive data structures that represent the geometrics primitives to the spatial data structure. The graphics system may use ray data structures that represent rays of light providing illumination in the three-dimensional image to model how the rays illuminate the objects in the three-dimensional image. The graphics generation system may trace a path of each ray to determine whether the ray intersects any of the primitives in the three-dimensional image. This may be done by using the ray data structure (that represents the ray) and the spatial data structure that includes the primitive data structures (that represent the primitives of the objects). In a particular embodiment, a kd-tree may be used to represent the three-dimensional image.

When a kd-tree is used to represent a three-dimensional image, the kd-tree may include three types of nodes: internal nodes, empty leaf nodes, and full leaf nodes. Each node may represent a portion of the three-dimensional image, called a bounding volume. For example, the bounding volume may be specified using two opposing corners of a cube and a length of each side of the cube. The three-dimensional image may be divided into many bounding volumes, with each bounding volume having a corresponding node in the spatial data structure.

Internal nodes may represent a subdivided portion of the three-dimensional image. Empty leaf nodes may represent empty portions of the three-dimensional image, i.e. portions of the three-dimensional image that do not contain any representations of objects. Empty leaf nodes may contain information on a background to display, e.g., a blue sky. Full leaf nodes may represent portions of the three-dimensional image that include objects. Each object in the three-dimensional image may be rendered using geometric primitives, such as triangles. The geometric primitives may be used to describe objects that occupy portions of the three-dimensional image. Each full leaf node may include data structures associated with the geometric primitives ("primitive data structures") that depict an object in a portion of the three-dimensional image.

A ray tracing algorithm may recursively divide the three-dimensional image into bounding volumes. Initially, the three-dimensional image may be split into two portions. Each resultant half portion may be further split into additional portions. The kd-tree is a hierarchical structure, with each branch representing a further splitting of the three-dimensional image. For example, four nodes at a particular level in the kd-tree may represent four portions, i.e. bounding volumes, of the three-dimensional image. A leaf node of the kd-tree may be empty when no object is present in the space represented by the leaf node, i.e., the space represented by the leaf node is empty or includes only a representation of a background (e.g., a sky) in the three-dimensional image. When an object is present in the space represented by a leaf node, the leaf node may include data ("primitive data structure") identifying the primitives that are used to depict the object. A primitive is a geometric shape, that when combined with other primitives, may be used to depict an object in a three-dimensional image. The primitive may be a triangle, a cube, a cylinder, another geometric shape, or any combination thereof. Each leaf node may be branched off from an internal node that is at a higher level in the kd-tree. Thus, a particular node may have leaf nodes that represent further divisions of the space associated with the particular node.

At any given level of the kd-tree, a data representation of the ray may be evaluated against the nodes (i.e., bounding volumes) to determine whether the ray misses, hits, refracts and/or reflects from an object. Rays may be tested for intersection with portions of the objects in the three-dimensional image by testing the corresponding ray data structures for intersection with leaf nodes of the spatial data structure. For example, the kd-tree may be traversed using a ray data structure representation of the ray to determine whether the ray intersects any of the portions of the three-dimensional image that are represented by the leaf nodes of the kd-tree. The traversal may start at a top node and recursively search nodes that branch off from the top node. Once a leaf node that corresponds to a portion of the object that is intersected by the ray has been identified, an algorithm may examine the properties of the primitive data structures in the leaf node that represent the intersected object to calculate the final color of the pixels used to render the intersected object.

The tree structure may be recalculated and rebuilt for every frame of an animated movie or game to allow frame-to-frame optimization of leaf nodes. How many primitive data structures occupy each leaf node may be based on a spatial distance from a reference point. For example, the number of primitive data structures that occupy a particular leaf node may be based upon the particular leaf node's distance from the center of a view frustum. A view frustum is a region of space from a three-dimensional image that may be viewed on a screen, i.e., a field of view of a notional camera. Primitive data structures that represent primitives may be inserted into leaf nodes of the kd-tree based upon whether the primitives lie within the view frustum of the three-dimensional image or whether the primitives are only needed for reflected rays and shadows.

Referring to FIG. 1, a first block diagram of a system to construct a spatial data structure is depicted and generally designated 10. The system 10 includes a computer 30 coupled to a network 38. The network 38 may include a local area network, a wide area network, a wireless network, a public network (e.g., the Internet), another type of network, or any combination thereof. Additional computers and devices (e.g., servers) may be networked through the network 38. The system 10 may also be referred to as an "apparatus," "computer," "tool," "device," or just "system," although it should be appreciated that the terms may respectively include many other configurations. Moreover, while only one network interface device is shown in FIG. 1, additional computers and devices may be networked through the network 38. In a particular embodiment, the system 10 may be implemented as a standalone configuration, i.e., disconnected from another computer or computer network.

The computer 30 may include at least one processor 12 coupled to a memory 32. The processor 12 may represent one or more processors (e.g., central processing units, microprocessors). The processor 12 of FIG. 1 may include a multiple core processing element. The memory 32 may include static random access memory (SRAM) devices, the main storage 42 of the computer 30, and supplemental levels of non-transitory memory, e.g., cache memories, non-volatile or backup memories (e.g., programmable or flash memories), read-only memories, etc. In addition, the memory 32 may include non-transitory memory storage physically located elsewhere in the computer 30, e.g., a cache memory present in the processor 12 and a storage device used as a virtual memory.

The computer 30 may include input interfaces and output interfaces for communicating information to and from the computer 30. To enable a user to interact with the computer 30, the computer 30 may include one or more input devices 33 (e.g., a keyboard, a mouse, a trackball, a joystick, a touch pad, iris/fingerprint scanner, and/or a microphone, among others). The computer 30 may also include a display device 39 (e.g., a CRT monitor, an LCD display panel, and/or a speaker). In a particular embodiment of the computer 30, direct user input and output may be unsupported by the computer 30 (e.g., the computer 30 may be a server). In this embodiment, the computer 30 may be accessed via another computer or workstation networked to the computer 30.

As shown in FIG. 1, the system 10 includes a camera 31 that may be used to capture images generated by a ray tracing operation. For additional storage, the system 10 may also include one or more mass storage devices 36 configured to store, for instance, film, animation or other image data. The mass storage devices 36 may include a floppy, a removable disk drive, a flash drive, a hard disk drive, a direct access storage device (DASD), an optical drive (e.g., a CD drive, a DVD drive, etc.), a tape drive, another type of storage device, or any combination thereof.

Furthermore, the computer 30 may include an interface with one or more networks (e.g., a LAN, a WAN, a wireless network, and/or the Internet, among others) to enable the communication of information with other computers coupled to the network 38. The computer 30 may also include suitable analog and/or digital interfaces between the processor 12 and each of the components of the system 10.

The computer 30 may operate under the control of an operating system 40. The computer 30 may execute various computer software and hardware applications, components, programs, and modules. In FIG. 1, the system 10 may include a culling algorithm 41, a main memory storage 42, an image rendering algorithm 43, a ray tracing program 44, an accelerated data structure (ADS) construction algorithm 45, a distance determination program 46, a graphics card program code 47, and a physics engine 48. The image rendering program 43 may be used to create an image at the display device 39 and may affect variables such as shadow quality, depth of recursion and sampling rates. The ray tracing program 44 may assist in image generation by tracing paths of light through pixels in a three-dimensional image. The graphics card program code 47 may be executed by a video card, also known as a graphics accelerator card, display adapter, or graphics card, and may be used to generate and output images to the display device 39.

The ADS construction algorithm 45 may be used to generate a spatial index used by the image rendering algorithm 43, the ray tracing programs 44, or both. The spatial index may be a grid index, a z-order index, a quadtree index, an Octree index, a Visual Basic (VB) tree index, an R-tree index, a kd-tree index, another spatial index, or any combination thereof. Spatial indexes may be used by spatial databases to optimize spatial queries, such as how far two points differ and whether points fall within a spatial area of interest.

The distance determination program 46 may determine a distance between a reference point (e.g., a point of origin of a ray) and a bounding volume. The distance determination program 46 may determine a distance between a reference point and a primitive.

The physics engine 48 may be an application that simulates real world physical phenomena as applied to objects within a three-dimensional image. The physics engine 48 may be used to simulate and predict the effects of physical phenomena on a frame-to-frame basis. For example, the physics engine 48 may perform position updates for an object when the object is moving, and may perform collision detection tests to determine whether an object collides with any other objects within the three-dimensional image. In a particular embodiment, the physics engine 48 may use multiple processing elements on a multiple core network on a chip (NOC) to perform physics-related calculations.

The processor 12 may be a multiple core processing element that includes basic throughput engines (BTEs). Each BTE may include a processing element (e.g., a processing core) and a core cache, such as a Level 1 (L1) cache. As shown in FIG. 1, the processing elements of the BTEs include workload managers 14 and 15 and vector throughput engines 16, 17, 18, 19, 20, and 21. The workload managers 14-15 may be referred to as master processing elements. The vector throughput engines 16-21 may be referred to as slave processing elements. The workload managers 14-15 may traverse an accelerated data structure (ADS) with a ray issued by the system 10. The ADS is a spatial index that may be implemented as a tree type data structure and is used to represent a three-dimensional image that is divided into bounding volumes. The system 10 may use ray tracing techniques and the ADS to determine whether the ray intersects a particular bounding volume. In a particular embodiment, the workload managers 14-15 may use the ADS to determine whether the ray intersects a bounding volume.

The vector throughput engines 16-21 may determine whether the ray intersects a primitive contained within the bounding volume. For example, after a workload manager 14 determines that the ray intersects the bounding volume, the workload managers 14 may use the inboxes 22-23 to send a ray data structure that represents the ray to one or more of the vector throughput engines 16-21. For example, each of the vector throughput engines 16-21 may be assigned a particular bounding volume. A particular vector throughput engine of the vector throughput engines 16-21 may determine whether the ray intersects a primitive contained within the bounding volume assigned to the particular throughput engine. The vector throughput engines 16-21 may perform additional operations, such as determining the color of a pixel through which the ray passes. The processing elements ("master processing elements") assigned to the workload managers 14-15 and the processing elements ("slave processing elements") assigned to the vector throughput engines 16-21 may access a shared multiple core processing element memory cache 24-25. In a particular embodiment, the memory caches 24-25 may include a Level 2 (L2) cache.

The workload managers 14-15 and vector throughput engines 16-21 may access the inboxes 22-23. The inboxes 22-23 may include memory mapped address space. Each processing element of the workload managers 14-15 and the vector throughput engines 16-21 may include a memory mapped inbox and access to all of the other memory mapped inboxes 22-23. The inboxes 22-23 may include a low latency, high bandwidth communications network used by the workload managers 14-15 and the vector throughput engines 16-21 to communicate with each other. The inboxes 22-23 may be used by the workload managers 14-15 and the vector throughput engines 16-21 to perform rapid inter-processing element communications without having to access a main memory, such as a random access memory.

The workload managers 14-15 and the vector throughput engines 16-21 may use the inboxes 22-23 to communicate with and to distribute data processing work amongst each other. In a particular embodiment, the workload managers 14-15 and the vector throughput engines 16-21 may use separate outboxes (not shown). For example, processing results may be received at the separate outboxes. In another particular embodiment, the inboxes 22-23 may be configured to serve as both inboxes and outboxes. For example, the workload managers 14-15 may write the results of a processing function directly to one of the inboxes 22-23 associated with one of the vector throughput engines 16-21 that will use the results. The workload managers 14-15 and the vector throughput engines 16-21 may partition and redistribute workloads to improve overall system performance and throughput. While FIG. 1 shows two processing cores in the processor 12, the system 10 may include more than two processing cores.

A high speed bus 26 may enable the workload managers 14-15 to collect and distribute image processing related tasks to the vector throughput engines 16-21. The bus 26 may enable the vector throughput engines 16-21 to communicate with one another or with the workload managers 14-15. Communications using the bus 26 may be accomplished without using the caches 24-25. In a particular embodiment, a portion of the caches 24-25 may be allocated to the inboxes 22-23. Each of the inboxes 22-23 may be assigned to one of the workload managers 14-15 or one of the vector throughput engines 15-21. The workload managers 14-15 and the vector throughput engines 16-21 may use the inboxes 22-23 to communicate with each other, without using the memory 32. For example, the workload manager 14 may provide data and/or instructions to the vector throughput engine 18 via the inbox 22. In a particular embodiment, the memory space of the inboxes 22-23 may be mapped to a global memory address.

In a particular embodiment, portions of the cache 24-25 may be assigned to the inboxes 22-23 to create a low latency and high bandwidth communications network. The remaining portions of the caches 24-25 may be used to store information, such as primitive data structures, ray data structures, and portions of the spatial data structure that may be reused when tracing subsequent rays or rendering subsequent frames. Primitive data structures, ray data structures, and portions of the spatial data structure that may not be reused when tracing subsequent rays or rendering subsequent frames may be flushed from the cache 24-25.

Thus, the system 10 may be used to rapidly generate a three-dimensional image by populating a spatial data structure with primitive data structures to depict objects in a three-dimensional image. Ray data structures that represent rays may be traced through the three-dimensional image to add details, such as shadows and reflections, to enhance the realism of the three-dimensional image. The various operations involved in populating the spatial data structure and tracing the rays may be performed substantially in parallel using the workload managers 14-15 and the vector throughput engines 16-21. By performing the operations substantially in parallel, the three-dimensional image may be rendered faster than when the operations are performed substantially in a serial manner.

Figure 2:
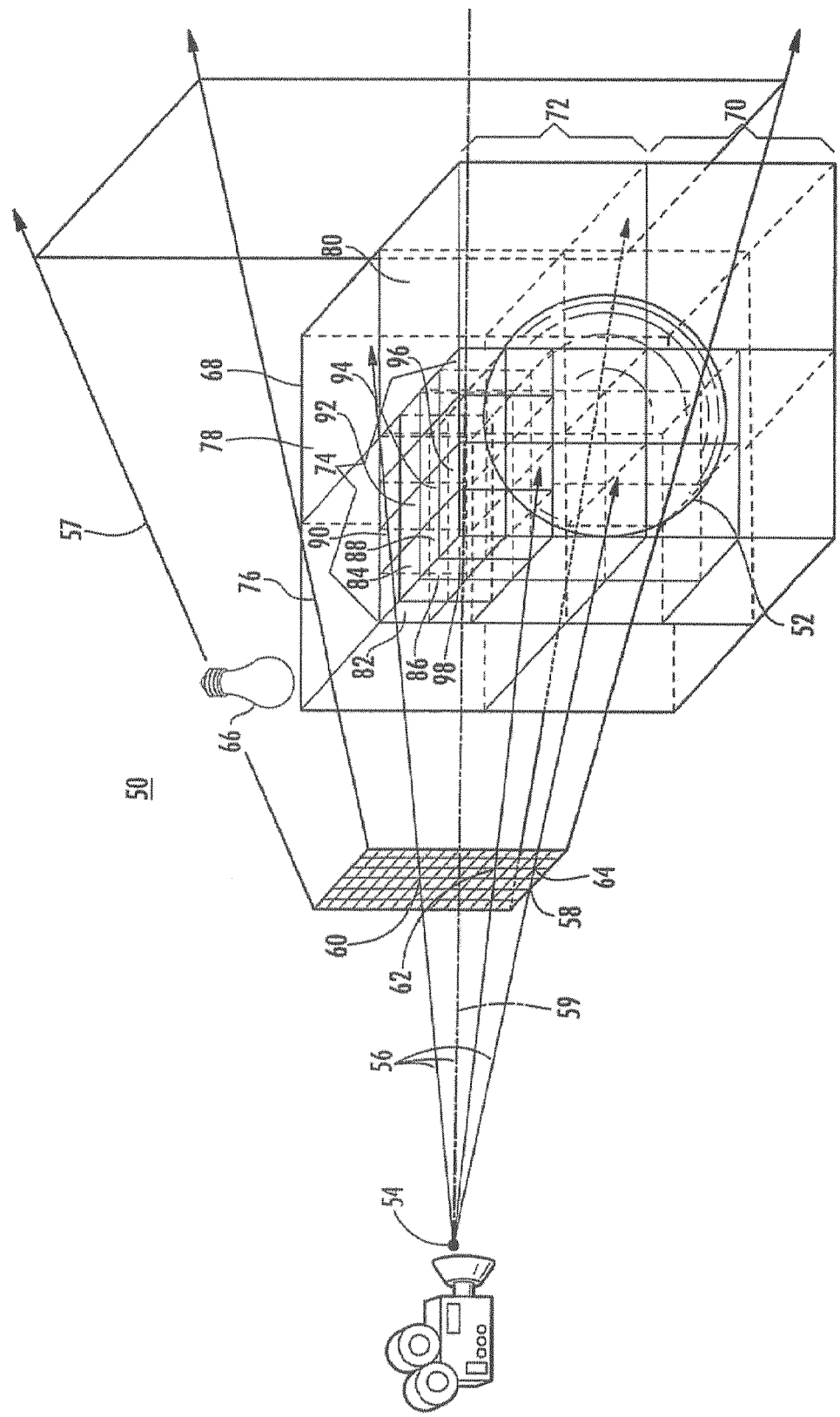
FIG. 2 is a logical representation of a first system to render a three-dimensional image.

Referring now to FIG. 2, a logical representation of a first system to render a three-dimensional image is depicted and generally designated 50. The system 50 depicts bounding volumes having sizes that vary according to their respective distances from a reference. The system 50 includes an object 52 viewed by an observer as represented by ray origin 54. The origin 54 may be associated with a camera viewpoint for a given frame.

Rays 56 extending from the ray origin 54 may create a perspective view of the object 52. The rays 56 may have properties and behavioral qualities that are similar to light rays. The rays 56 may intersect a pixel plane 58 that includes multiple pixels. A pixel (i.e., a picture element) may be considered the smallest piece of information in a three-dimensional image. Pixels may be arranged in a two-dimensional grid. Each pixel may be a sample of an original image and may include color components. The pixel plane 58 may be rendered as a two-dimensional image by the image processing system 10 of FIG. 1. The resultant two-dimensional image may be displayed at a display device, such as the display device 39. The display device 39 may use pixels of different colors to render the two-dimensional image.

One of the rays 56 may traverse the system 50 and the pixel plane 58, where the final two-dimensional picture will be rendered by the system 10 of FIG. 1. Pixels 60, 62, 64 may represent intersections of the rays 56 with the object 52. The object 52 may include part of a three-dimensional image to be rendered by the system 10. While only a single object 52, i.e., a sphere, is shown in FIG. 2, additional objects (not shown) may be present. Each of the objects may be represented by primitives.

The object 52 and the surrounding space may be divided into bounding volumes that correspond to nodes of a spatial data structure. For example, a large bounding volume 68 may correspond to a first node of a spatial data structure that represents the entire viewable three-dimensional image. The three-dimensional image may be divided into portions via bounding volumes. For example, the bounding volume 68 may be divided into bounding volumes 70 and 72. The bounding volumes 70 and 72 may be further divided into bounding volumes 74, 76, 78, and 80, each of which roughly correspond to a quarter of the bounding volume 68. The bounding volumes 74, 76, 78, and 80 may be further subdivided into smaller bounding volumes. For example, the bounding volume 74 may be further subdivided into smaller bounding volumes 82, 84, 86, 88, 90, 92, 94, 96, and 98. In a particular embodiment, the virtual space may be divided into different sized bounding volumes using other types of algorithms. In a particular embodiment, the relative sizes of the bounding volumes may be modified according to their respective distances from a reference. For example, the ray origin 54 may be a reference. Other references may include a point within the image data, such as a portion of a ray. In another embodiment, a reference may include a ray 59 that corresponds to a center of a view frustum 57. Still another reference may include the view frustum 57 or boundary of the view frustum 57. The bounding volumes closest to the reference (e.g., the bounding volumes 82, 84, 86, 88, 90, 92, 94, and 96) may be smaller than the bounding volumes that are farther from the reference (e.g., the bounding volumes 52, 70).

The view frustum 57 may include a region of space in a modeled world (i.e., the three-dimensional image) that is viewable by a viewer. The view frustum 57 may represent the field of view of a notional camera. The exact shape of this region may vary based on a type of camera lens that is being simulated. In FIG. 2, the view frustum 57 is depicted as a rectangular pyramid. The planes that cut the view frustum 57 perpendicular to the viewing direction may be referred to as the near plane and the far plane. Objects that are closer to the ray origin 54 than the near plane or beyond the far plane may not be drawn.

FIG. 2 also shows a light source 66. The light source 66 may illuminate the object 52. Depending on the location of the light source 66 and the object 52, the light source 66 may cause shadows to be cast onto other objects (not shown) within the scene. In a particular embodiment, the pixel plane 58 may include millions of pixels. Each individual pixel may display a different color to render the two-dimensional picture on a display device, such as the display 39 of FIG. 1. A ray tracing algorithm may calculate the colors that the rays 56 encounter in the system 50. An image processing system may assign colors encountered to the pixels 60, 62, and 64 of FIG. 2 when one or more of the rays 56 passes through the pixels 60, 62, and 64 on its way from the origin 54 to the object 52.

Where more than one ray intersects a pixel, the color of the pixel may be determined based on combining a color contribution from each of the rays that intersect the pixel. Another pixel may have a single ray intersect the pixel, resulting in the single ray determining the resulting color of the pixel. Some pixels may not be intersected by any of the rays issued by the image processing system, in which case their color may be determined, approximated or assigned by algorithms within the image processing system. For example, if a ray does not intersect an object within the scene it may be assigned a default background color, e.g., approximating the color of the sky.

Many factors may contribute to the color of the object 52 struck by the rays 56. For example, the light source 66 within the three-dimensional scene may illuminate the object 52. In addition, physical properties of the object 52 may contribute to the color of the object 52. For example, when the object 52 is reflective or transparent, other non-light source objects (not shown) may also contribute to the color of the object 52. To illustrate, a first object with a reflective surface may reflect a portion of a second object that is located near the first object, thereby contributing to a color of the reflective surface of the first object.

To determine the effect of a ray intersecting the object 52 on other objects (not shown) located near the object 52, secondary rays may be issued from the point where an original ray intersects the object 52. For example, one type of secondary ray may be a shadow ray. A shadow ray may be used to determine the contribution of light at the point where the original ray intersects the object 52. The shadow ray may be traced from a point of intersection of an original ray and the object 52 to the light source 66. When the original ray reaches the light source 66 without encountering another object, the light source 66 may illuminate the object 52 struck by the original ray at the point where the original ray struck the object 52. When the object 52 is translucent or transparent, the light source 66 may illuminate the object 52 at the point where the original ray 56 struck the object 52. The total contribution of color and light of all secondary rays (e.g., shadow rays, transmitted rays, reflected rays, etc.) may contribute to the final color of the pixel through which the original ray passes.

A second type of secondary ray may be a transmitted ray. A transmitted ray may be used to determine what color light may be transmitted through the body of the object 52. A ray data structure representation of a transmitted ray may be created by the image system 10 when the object 52 intersected by the original ray has transparent or translucent properties. For instance, when the object includes colored glass, a transmitted ray intersecting the glass may be colored based on the color of the glass at the point at which the transmitted ray emerges from the colored glass. A transmitted ray may traverse through the object 52 at an angle relative to the angle at which the original ray struck the object 52.

A third type of secondary ray may be a reflected ray. A reflected ray may be used to depict color or light that is reflected by the object 52. When the object 52 has reflective properties, such as a metal surface, a reflected ray may be issued to depict color or light that is reflected by the object 52 on to other objects (not shown). Reflected rays may traverse away from the object 52 at an angle relative to the angle at which the original ray intersects the object 52.

Thus, by tracing the rays 56 through a three-dimensional image, additional details can be added, such as shadows and reflections, to enable the three-dimensional image to be rendered in a photo realistic manner. By using an appropriate spatial data structure for representing the three-dimensional image (e.g., the spatial data structure of FIG. 3) and an appropriate system (e.g., the system of FIG. 1) for ray tracing, the ray tracing may be performed substantially in parallel, thereby enabling the two-dimensional image 58 to be generated faster than when the ray tracing is performed substantially in a serial manner.

Figure 3:
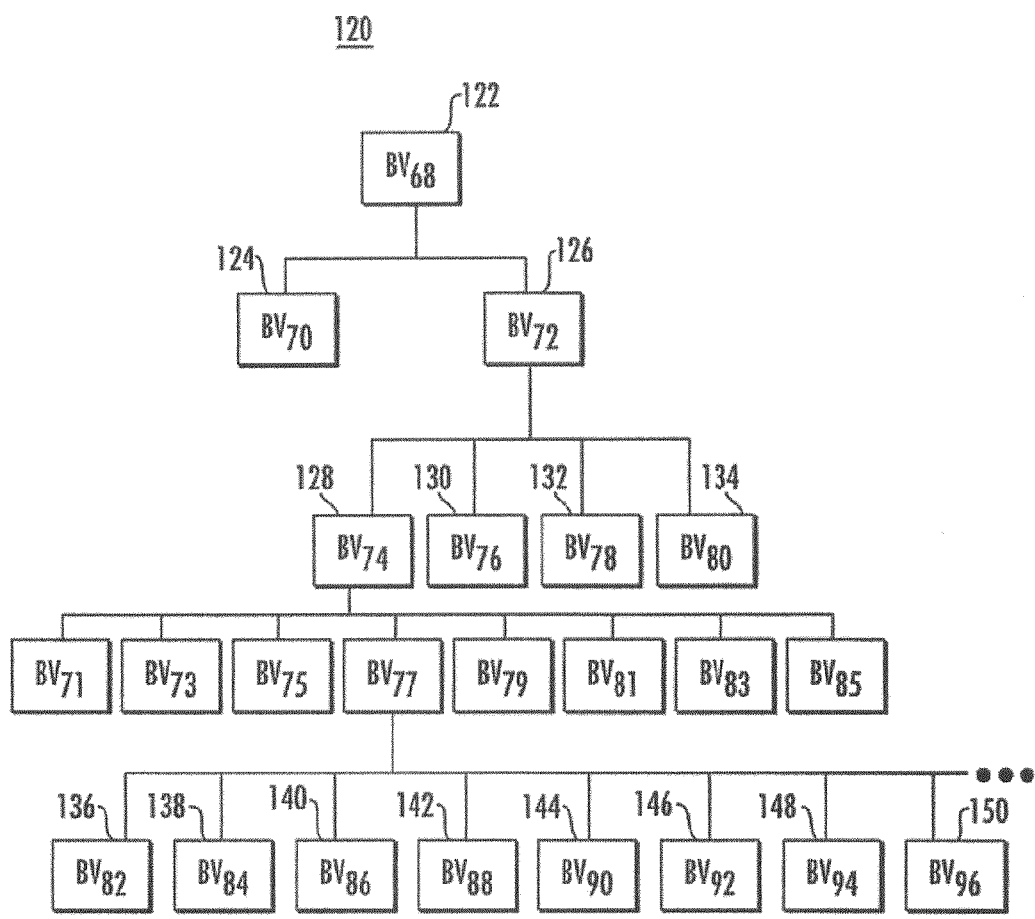
FIG. 3 is a first exemplary embodiment of a spatial data structure.

Referring to FIG. 3, a first exemplary embodiment of a spatial data structure is depicted and generally designated 120. The spatial data structure 120 may be a spatial index, such as a kd-tree. Node 122 of the spatial data structure 120 may correspond to bounding volume 68 of FIG. 2. Bounding volumes 70, 72 of FIG. 2 may be represented by nodes 124, 136 of FIG. 3. Nodes 128, 130, 132, and 134 of FIG. 3 may correspond to bounding volumes 74, 76, 78, 80 of FIG. 2, respectively. Leaf nodes 136, 138, 140, 142, 144, 146, 148, and 150 may correspond to the smallest bounding volumes 82, 84, 86, 88, 90, 92, 94, and 96 of FIG. 2.

The spatial data structure 120 may be used to determine whether an issued ray intersects any of the objects within a three-dimensional image to be rendered by a graphics generation system. The spatial data structure 120 may represent a division of a three-dimensional image into relatively smaller bounding volumes. Leaf nodes of the spatial data structure 120 may correspond to bounding volumes that include primitives. The leaf nodes may include primitive data structures that represent the primitives in the corresponding bounding volumes. An image processing system may use the boundaries of the smaller bounding volumes to determine whether a ray intersects primitives associated with the smaller bounding volumes. When a ray intersects a bounding volume that contains primitives, a ray intersection test may be performed using the projected trajectory of the ray as described by the ray data structure against the primitive data structures that represent the primitives.

When a ray does not intersect a particular bounding volume, a ray intersection test may not be performed against the primitive data structures in the leaf node that corresponds to the particular bounding volume. Thus, by reducing the number of ray-primitive intersection tests that may be performed, the use of a spatial index, such as the spatial data structure 120, may increase the performance of a ray tracing image processing system, such as the system 10 of FIG. 1.

Different types of spatial indexes may be used for the spatial data structure 120, such as an oc-tree, a kd-tree, a binary space partitioning trees (BSP trees), another type of data structure that can be used as a spatial index, or any combination thereof. While any type of spatial index may be used for the spatial data structure 120, for ease of describing the various embodiments, a kd-tree is used as the spatial index for the examples in this disclosure.

The kd-tree may be created by recursively splitting the three-dimensional image into bounding volumes using axis-aligned planes, such that the kd-tree has a node corresponding to each bounding volume. For example, the three-dimensional image may be split using planes aligned on an x-axis (horizontal axis) or a y-axis (vertical axis). Initially, the scene may be split in two. Each half may then be further split until the three-dimensional image is split into multiple bounding volumes. Each bounding volume may have a corresponding node in the kd-tree, resulting in a hierarchical organization of the kd-tree. Each level of the kd-tree may be recursively traversed to determine where a next level of the kd-tree may be found. The kd-tree may be created during a construction phase to achieve optimum performance when traversing the kd-tree. Thus, the kd-tree may be constructed by dividing a three-dimensional image into bounding volumes, with each bounding volume adding a corresponding node to the kd-tree. An image processing system, such as the image processing system 10 of FIG. 1, may use the ADS construction algorithm 45 to determine when to divide a larger bounding volume into two smaller bounding volumes.

The ADS construction algorithm 45 may determine when to divide a larger bounding volume into smaller bounding volumes using distance determination information. For example, how many primitives are in a particular bounding volume may determine when the particular bounding volume is partitioned into smaller bounding volumes. For example, when a particular bounding volume contains more primitives than a predetermined threshold, the ADS construction algorithm 45 may divide the particular bounding volume into smaller bounding volumes. Other criteria for determining when to partition a particular bounding volume into smaller volumes may be an amount of space contained within the particular bounding volume and how many primitives are intersected by an axis-aligned plane that creates the particular bounding volume.

The spatial data structure 120 may be a hierarchical structure representing the partitioning of a three-dimensional image, such as the three-dimensional image 50 of FIG. 2. The spatial data structure 120 may include nodes, branches and leaves. For instance, internal node 126 within the spatial data structure 120 may represent a relatively large bounding volume 72. Node 126 may contain branches to sub-nodes 128, 130, 132, and 134 that may respectively represent four relatively smaller bounding volumes 74, 76, 78, and 80. The bounding volumes 74, 76, 78, and 80 may be created by partitioning the relatively large bounding volume 72 by a splitting plane.

In a kd-tree, each internal node may include branches to other nodes. An internal node may store information, such as pointers to leaf nodes, as well as information about the boundaries of the bounding volume. In a particular embodiment, the internal node may include branches (i.e., pointers) to leaf nodes. A leaf node 136 is a node that may not be further sub-divided into smaller volumes. The leaf node 136 may contain primitive data structures that represent primitives. An internal node may also contain branches to other internal nodes when the bounding volume corresponding to the internal node is further subdivided into smaller bounding volumes. An internal node may also include the information specifying along what axis the splitting plane was drawn and where along the axis the splitting plane was drawn.

The ADS construction algorithm 45 of FIG. 1 may continue to partition a bounding volume 77 when the bounding volume 77 contains more than a predetermined threshold of primitives. For example, when the predetermined threshold is two primitives, a bounding volume with more than two primitives may be divided into smaller bounding volumes. Accordingly, the ADS construction algorithm 45 may stop partitioning a bounding volume 90 that contains less than or equal to the number of primitives associated with the predetermined threshold. Such a node may be a leaf node of the kd-tree, such as the leaf node 140, because it may not be further subdivided.

The spatial data structure 120 may be stored in a cache, such as the shared memory cache 24 of FIG. 1. In a particular embodiment, the kd-tree may be optimized for storage in the shared memory cache 24. Although FIG. 3 shows a spatial data structure 120 corresponding to a three-dimensional image, another kd-tree embodiment may correspond to a two dimensional image to be rendered by an image processing system.

With collective reference to FIGS. 1-3, the system 10 may issue rays starting from the top of the pixel plane 58 and continue issuing rays, one ray per pixel, moving down the grid of pixels until a ray has been issued for each pixel in the plane 58. Multiple rays may ultimately issue through select pixels.

The workload manager 14 may perform operations related to the traversal of the rays 56 through the three-dimensional image using ray data structures that represent the rays 56 and the spatial data structure 120. For instance, the workload manager 14 may traverse the spatial data structure 120 by taking branches to nodes 122, 126, and 128 that represent bounding volumes 68, 72, and 74 intersected by a ray until a leaf node 150 is reached. To illustrate, the workload manager 14 may use the coordinates and trajectory of the ray to determine whether the ray intersects bounding volumes 68, 72, and 74 that are represented by the nodes 122, 126, and 128, respectively, of the spatial data structure 120. The workload manager 14 may continue traversing the spatial data structure 120 until the workload manager 14 identifies a leaf node corresponding to a bounding volume 96 that contains only primitives that is intersected by the ray. After identifying the leaf node, the workload manager 14 may send information specifying the ray and an intersected pixel 64, as well as information defining an intersected node to a vector throughput engine 18.

After the workload manager 14 sends the ray data structure to the vector throughput engine 18, the workload manager 14 may begin traversing through the spatial data structure 120 using another ray data structure that represents another ray of the rays 56. Thus, the workload manager 14 may continuously traverse through the spatial data structure 120 using ray data structures representing the rays 56 while the vector throughput engines 16-21 determine whether rays 56 intersect an object 52 within the three-dimensional image. The vector throughput engines 16-21 may perform ray-primitive intersection tests after they have received the information specifying the ray and the intersected bounding volume (i.e., represented by the leaf node). The vector throughput engines 16-21 may determine the color of the object 52 at the point where it is intersected by the ray 56.

After determining the color of the object 52 at the intersection point, the vector throughput engine 16 may update the color of the pixel 60 through which one of the rays 56 passes. For example, the vector throughput engine 16 may write to a frame buffer memory location that corresponds to the pixel 60.

The vector throughput engines 16-21 may generate secondary ray data structures that represent secondary rays. For example, the vector throughput engine 16 may generate a reflected ray data structure and a transmitted/refracted ray data structure. Both secondary rays may originate from a point where a ray intersects the object 52. As described herein, the secondary rays may be used to determine additional color contribution to the object 52 at the point where the ray intersects the object 52. The generation of secondary ray data structures may include determining a trajectory for each secondary ray and tagging each secondary ray data structure such that the additional color contribution from the secondary ray may be used to update the color of the pixel 60 through which the ray passes. The vector throughput engine 16 may use an inbox 22 to send secondary ray data structures (that represents secondary rays) to a workload manager 14. The workload manager 14 may receive the secondary ray data structures and use the trajectory and other information associated with the secondary rays to traverse the spatial data structure 120.

Thus, by using a spatial data structure, such as the spatial data structure 120, to represent a three-dimensional image may enable rapid traversal of the spatial data structure compared to other types of spatial data structures. Rapid traversal of the spatial data structure may enable the three-dimensional image to be generated relatively quickly, particularly when multiple processing elements can perform the operations to generate the three-dimensional image substantially in parallel.

Figure 4:
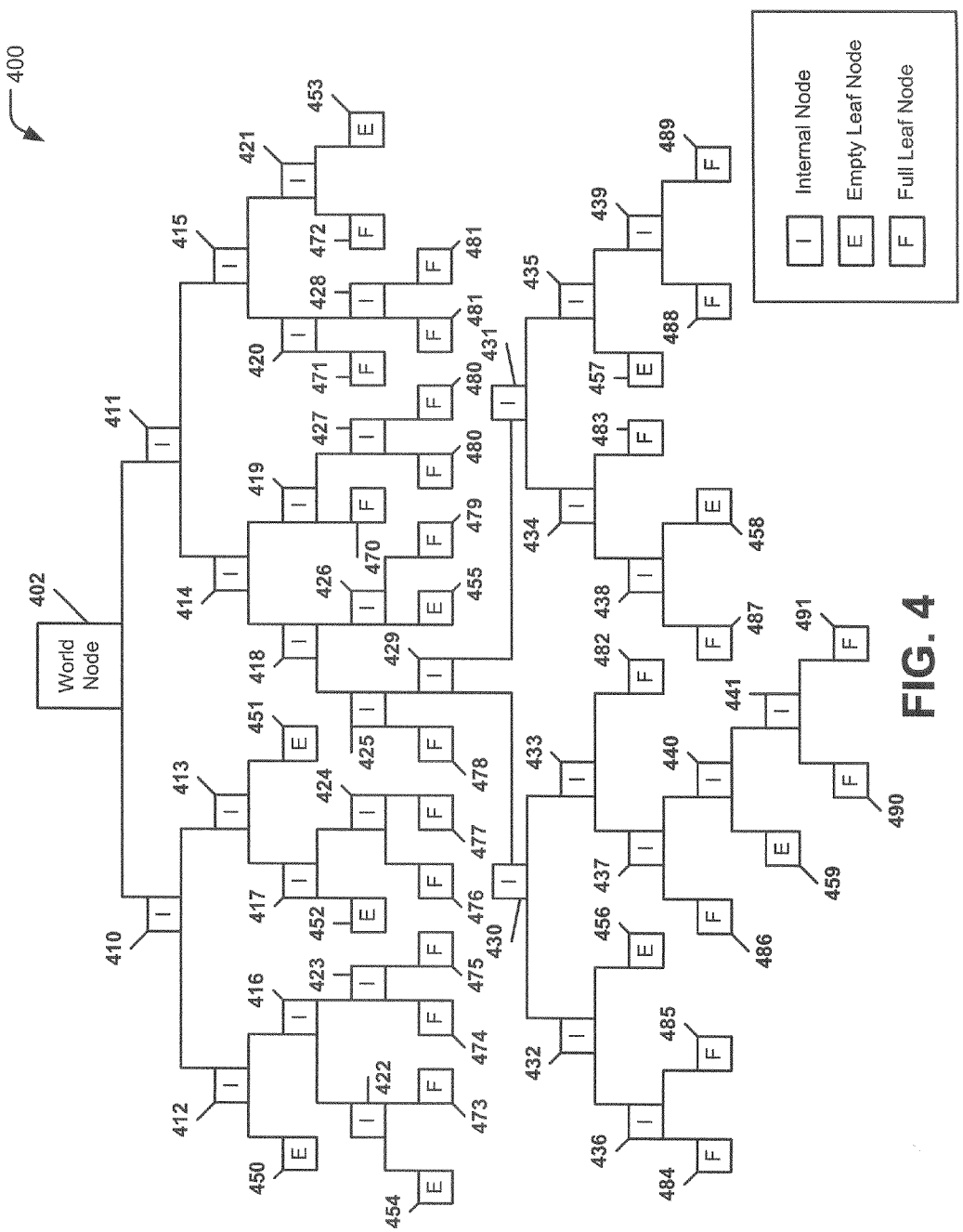
FIG. 4 is a second exemplary embodiment of a spatial data structure.

Referring to FIG. 4, a second exemplary embodiment of a spatial data structure that represents a three-dimensional image is depicted and generally designated 400. The spatial data structure 400 includes a world node 402, internal nodes 410-441, empty leaf nodes 450-459, and full leaf nodes 470-491.

The spatial data structure 400 is a binary tree, in which each parent node may have two child nodes. The world node 402 may represent the three-dimensional image as a whole while the other nodes may represent portions of the three-dimensional image. For example, the internal nodes 410 and 411 may represent two portions of the three-dimensional image. In a particular embodiment, each portion of the three-dimensional image may be represented using a bounding volume. Each portion of the three-dimensional image may be further sub-divided into additional bounding volumes. Each bounding volume may have a corresponding node in the spatial data structure 400. The empty leaf nodes 450-459 may correspond to empty portions of the three-dimensional image, i.e., portions of the three-dimensional image that do not include any objects. The full leaf nodes may correspond to non-empty portions of the three-dimensional image, i.e., portions of objects that are rendered in the three-dimensional image.

In a particular embodiment, the spatial data structure 400 may be created prior to populating the leaf nodes of the spatial data structure 400. For example, the spatial data structure 400 may be created with a predetermined number of nodes. To illustrate, a first-person shooter video game may have a predetermined number of rooms in which in a user may find themselves. Each room may have certain specific characteristics or details. Each particular room may be modeled using a predefined spatial data structure that has the appropriate number of nodes in the appropriate locations for depicting the specific characteristics or details of that particular room. For example, in the spatial data structure 400, the internal node 430 has fourteen child nodes (i.e. 432, 433, 436, 437, 440, 441, 456, 459 482, 484, 485, 486, 490, and 491) while the internal node 431 has ten child nodes (i.e. 434, 435, 438, 439, 457, 458, 483, 487, 488, and 489). The internal node 430 may have more child nodes than the internal node 431 because there may be more objects located in the portion of the three-dimensional image associated with the internal node 430 than in the portion of the three-dimensional image associated with the internal node 431.

By using the binary tree spatial data structure 400 to represent a three-dimensional image, the binary tree spatial data structure 400 may be traversed and populated relatively quickly compared to other spatial data structures. For example, the spatial data structure 400 may be traversed and populated using a recursive algorithm that is relatively small and can be executed in a relatively short amount of time.

Figure 5:
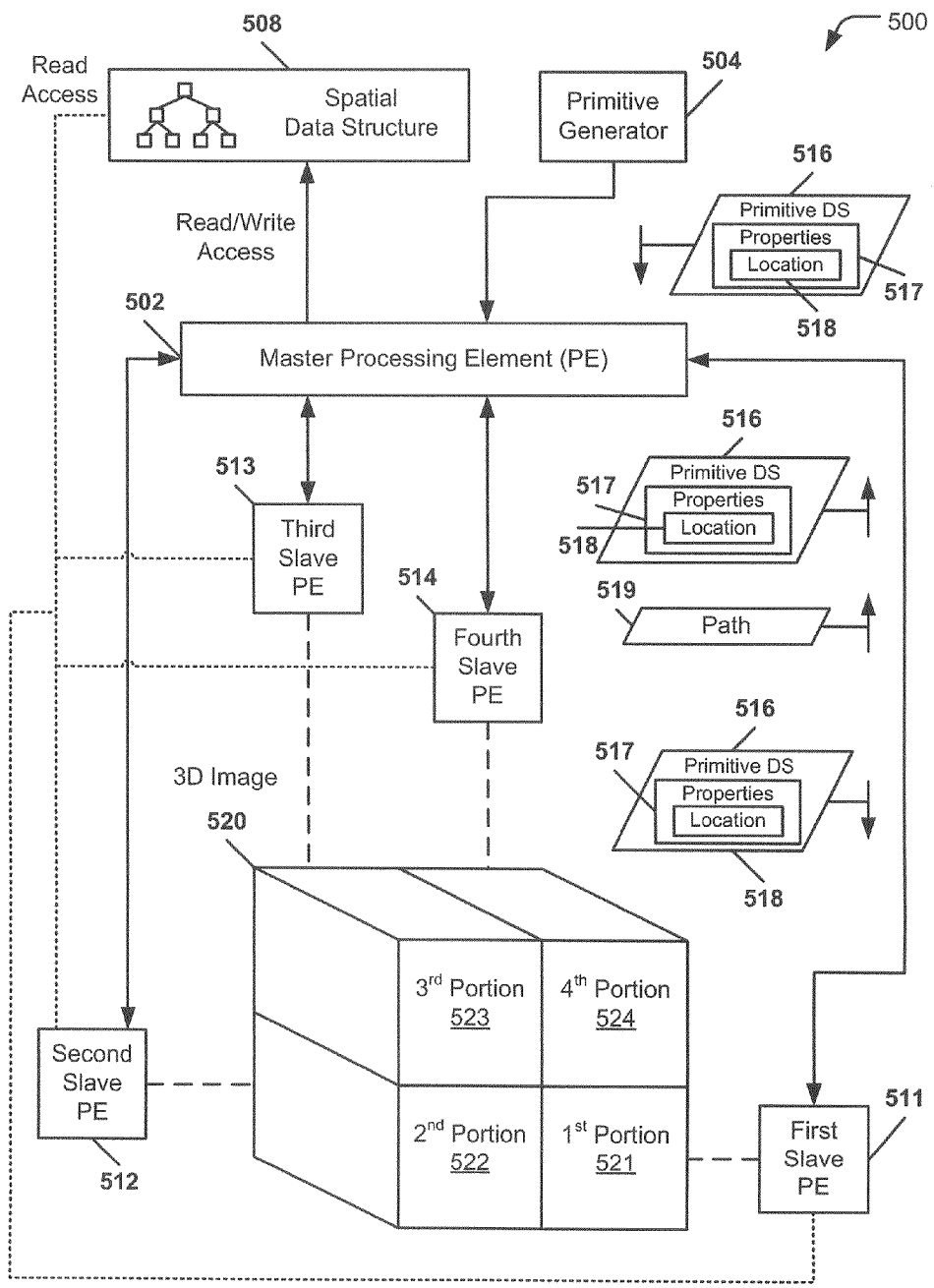
FIG. 5 is a second block diagram of a system to populate a spatial data structure.

Referring to FIG. 5, a second block diagram of a system to populate a spatial data structure is depicted and generally designated 500. The system 500 includes multiple processing elements, such as a master processing element 502, a primitive generator 504, a spatial data structure 508, a first slave processing element 511, a second slave processing element 512, a third slave processing element 513 and a fourth slave processing element 514. Each of the processing elements may be programmable hardware processing cores that are communicatively coupled on a network on a chip (NOC). The master processing element 502 and the slave processing elements 511-514 may be executed at a multiple core processor, such as the processor 12 of FIG. 1. A three-dimensional image 520 may include four portions: a first portion 521, a second portion 522, a third portion 523, and a fourth portion 524. For example, each portion may be a bounding volume. Each of the portions 521-524 may correspond to nodes of a spatial data structure. For example, the portions 521-524 may correspond to the internal nodes 412-415 of FIG. 4, respectively. As another example, the portions 521-524 may correspond to the leaf nodes 454, 473, 474, and 475 of FIG. 4, respectively.

When rendering a three-dimensional image, such as the three-dimensional image 520, a graphics system may initially create the spatial data structure 508. The spatial data structure

508 may be created by recursively subdividing the three-dimensional image into bounding volumes and adding nodes to the spatial data structure 508 based on the bounding volumes of the three-dimensional image 520. Thus, each node of the spatial data structure 508 may correspond to a bounding volume of the three-dimensional image 520. To represent the objects (not shown) located in the three-dimensional image 520, the graphics system may use geometric primitives as building blocks to depict each object. The graphics system may add primitive data structures that represent the primitives to the spatial data structure 508. After adding the primitive data structures to the spatial data structure 508, the graphics system may use ray data structures to represent rays of light providing illumination in the three-dimensional image 520. The graphics system may trace a path of a ray to determine whether the ray intersects any of the primitives in the three-dimensional image 520 using the ray data structure (that represents the ray) and the spatial data structure 508 that includes the primitive data structures (that represent the primitives).

The primitive generator 504 may generate primitive data structures (referred to as "primitive data") that represent primitives. The primitive generator 504 may send the primitive data structures to the master processing element for insertion into the spatial data structure 508. For example, the primitive generator 504 may generate the primitive data structure 516 and send the primitive data structure 516 to the master processing element 502 for insertion into the spatial data structure 508. Each of the primitive data structures generated by the primitive generator 504 may represent data associated with a geometric primitive, such as a triangle, a rectangle, a square, a cylinder, another type of geometric primitives or any combination thereof. Each object in the three-dimensional image 520 may be rendered using one or more geometric primitives. A particular primitive data structure may include properties associated with the primitive that is represented by the particular primitive data structure, such as a location of the primitive in the three-dimensional image. For example, a primitive data structure 516 may include properties 517. The properties 517 may include a location 518 in the three-dimensional image of the primitive represented by the primitive data structure 516.

The spatial data structure 508 may be a spatial index data structure, such as the k-d tree of FIG. 3, the binary tree of FIG. 4, another type of spatial index data structure, or any combination thereof. The spatial data structure 508 may be updated by the master processing element 502 to add the primitive data structures generated by the primitive generator 504 to render objects in the three-dimensional image 520.

The master processing element 502 may receive the primitive data structures, such as the primitive data structure (DS) 516, from the primitive generator 504, and begin populating the spatial data structure 508. For example, this process may be performed to generate each frame of a video game or a movie. After receiving a primitive data structure, the master processing element 502 may traverse one or more levels of the spatial data structure 508 to identify a portion of the three-dimensional image 520. For example, the master processing element 502 may receive the primitive data structure 516 and partially traverse the spatial data structure 508 based on the properties 517, such as the location 518 of the primitive (represented by the primitive data structure 516) in the three-dimensional image. The master processing element 502 may determine which of the slave processing elements 511-514 are associated with that portion of the three-dimensional image 520 and send the primitive 516 to the associated slave processing element. For example, the master processing element 502 may partially traverse the spatial data structure 508 to a particular node and determine that the node corresponds to the first portion 521.

The number of levels of the spatial data structure 508 that the master processing element 502 traverses may be based on a workload of the master processing element 502. For example, when the master processing element 502 has relatively few items in an associated inbox (not shown) the master processing element 502 may traverse more levels of the spatial data structure 508. When the master processing element 502 has many items in an associated inbox (not shown) the master processing element 502 may traverse fewer levels of the spatial data structure 508.

The master processing element 502 may determine that the first portion 521 is associated with the first slave processing element 511 and send the primitive data structure 516 to the first slave processing element 511. The master processing element 502 may receive a path to a leaf node from the associated slave processing element. The master processing element 502 may access the leaf node of the spatial data structure 508 using the path and insert the primitive data structure 516 into the spatial data structure 508. Thus, the master processing element 502 may use the slave processing elements 511-514 to identify leaf nodes of the spatial data structure 508 into which primitive data structures may be inserted.

In a particular embodiment, the master processing element 502 and the slave processing elements 511-514 may use inboxes, such as the inboxes 22-23 of FIG. 1, to communicate with each other. For example, the primitive data structures received from the primitive generator 504 may be placed in a first inbox associated with the master processing element 502. The paths to leaf nodes received from the slave processing elements 511-514 may be placed in a second inbox associated with the master processing element 502. The master processing element 502 may remove the primitive data structures and the paths from the first and second inboxes, respectively, for processing in various orders. For example, the master processing element 502 may process contents of the first and second inbox based on a number of items in each of the first and second inboxes, based on a priority associated with each of the primitive data structures and the paths, other factors associated with each of the primitive data structures and the paths, or any combination thereof.

The slave processing elements 511-514 may receive primitive data structures, such as the primitive data structure 516, from the master processing element 502. The slave processing elements 511-514 may traverse the spatial data structure 508 further to identify a leaf node where a particular primitive data structure maybe inserted. The slave processing elements 511-514 may then return the primitive data structures to the master processing element 502 along with paths to the leaf nodes where the primitive data structures may be inserted.

In operation, the master processing element 502 may receive primitive data structures, such as the primitive data structure 516, from the primitive generator 504. Each primitive data structure may include properties, such as the properties 517 that include the location 518. The location 518 may indicate where in the three-dimensional image 520 a primitive (represented by the primitive data structure 516) is located. The master processing element 502 may partially traverse the spatial data structure 508 based on the properties 517. The master processing element 502 may determine that the primitive (represented by the primitive data structure 516) has a location somewhere in the first portion 521. The master processing element 502 may determine that the first slave processing element 511 is associated with the first portion 521 and send the primitive data structure 516 to the first slave processing element 511.

How many levels of the spatial data structure 508 the master processing element 502 traverses may depend upon a workload of the master processing element 502. For example, when the master processing element 502 has a large workload, the master processing element 502 may traverse fewer levels of the spatial data structure 508 and when the master processing element 502 does not have a large workload, the master processing element 502 may traverse more levels of the spatial data structure 508. In a particular embodiment, the workload of the master processing element 502 may be determined based on a number of primitives received by the master processing element 502 that have not yet been sent to one of the slave processing elements 511-514, a number of primitives to be inserted into the spatial data structure 508, another measurement of the workload of the master processing element 502, or any combination thereof.

In a particular embodiment, a second master processing element (not shown) may function in conjunction with the master processing element 502. For example, the master processing element 502 and the second master processing element may divide various tasks amongst each other. To illustrate, in a particular embodiment, the second master processing element may receive the primitive data structures from the primitive generator 504. For each primitive data structure the second master processing element may identify one of the slave processing elements 511-514 that is associated with a portion of the three-dimensional image 520. The second master processing element may send the primitive data structure to the slave processing element that is associated with the portion of the three-dimensional image. In this embodiment, the second master processing element may identify slave processing elements to process primitives and send the primitives to the slave processing elements while the master processing element 502 may receive paths from the slave processing elements 511-514 and insert primitive data structures using the paths into the spatial data structure 508. Other embodiments may use different functional allocations to divide the functions performed by the master processing element 502 and the second master processing element.

The first slave processing element 511 may receive the primitive data structure 516 from the master processing element 502 and traverse the spatial data structure 508 based on the location 518 until a leaf node associated with the location 518 is found. The first slave processing element 511 may determine whether the primitive data structure 516 can be inserted into the leaf node corresponding to the location 518. When the primitive data structure 516 can be inserted into the leaf node corresponding to the location 518, the first slave processing element 511 may send the path 519 to the leaf node to the master processing element 502. The master processing element 502 may access the leaf node using the path 519 and insert the primitive data structure 516 into the leaf node. The path 519 may enable the master processing element 502 to quickly access a leaf node of the spatial data structure 508 and insert the primitive data structure 516 into the leaf node. In a particular embodiment, the path 519 may be a binary string mask in which a zero represents a left branch and a one represents a right branch.

When the number of primitive data structures in the leaf node satisfies a particular threshold, the first slave processing element 511 may be unable to insert the primitive data structure 516 into the leaf node. For example, each leaf node may have a maximum number of primitive data structures that may be inserted into each leaf node. When the first slave processing element 511 determines that the primitive data structures in the leaf node satisfy the particular threshold, the first slave processing element 511 may determine whether the leaf node may be expanded. For example, the leaf node may be expanded by adding one or more child nodes to the leaf node. The first slave processing element 511 may determine whether expanding the leaf node results in the primitives (represented by the primitive data structures in the expanded leaf node) remaining in the first portion 521. When the primitives (represented by the primitive data structures in the expanded leaf node) remain in the first portion 521, the first slave processing element 511 may send the path 519 to the expanded leaf node to the master processing element 502. The master processing element 502 may receive the path 519 and access the spatial data structure 508 using the path 519. The master processing element 502 may insert the primitive data structure 516 into the expanded leaf node of the spatial data structure 508.

The first slave processing element 511 may determine that expanding the leaf node results in the primitives (represented by the primitive data structures in the expanded leaf node) to enter another portion of the three-dimensional image 520. For example, the first slave processing element may determine that expanding the leaf node causes the primitives (represented by the primitive data structure in the expanded leaf node) to enter the fourth portion 524 associated with the fourth slave processing element 514. When the first slave processing element 511 determines that the expanded leaf node results in the primitives (represented by the primitive data structures in the expanded leaf node) entering one of the portions 521-523, the first slave processing element 511 may send the primitive data structure 516 to the one of the slave processing elements 512-514. For example, the first slave processing element 511 may determine that the primitives (represented by the primitive data structures of the expanded leaf node) enter the fourth portion 524. The first slave processing element 511 may determine that the fourth slave processing element 514 is associated with the fourth portion 524 and send the primitive 516 to the fourth slave processing element 514. In a particular embodiment, the first slave processing element 511 may identify a slave thread associated with a portion of the three-dimensional image by accessing a table (not shown) that includes information regarding which of the slave processing elements 511-514 are associated with which portions 521-524 of the three-dimensional image 520. In another particular embodiment, the first slave processing element 511 may identify a slave thread associated with a portion of the three-dimensional image by querying the master processing element 502.

One of the slave processing elements 512-514 may receive the primitive 516 from the first slave processing element 511, expand the leaf node, and send the path 519 to the expanded leaf node to the master processing element 502. For example, the fourth slave processing element 514 may receive the primitive 516 from the first slave processing element 511. The fourth slave processing element 514 may expand the leaf node and send the path 519 to the expended leaf node to the master processing element 502. The master processing element 502 may receive the path 519 and access the spatial data structure 508 using the path 519. The master processing element 502 may add the primitive data structure 516 to the expanded leaf node of the spatial data structure 508.

Thus, the master processing element 502 may use the slave processing elements 511-514 to identify a leaf node of the spatial data structure 508 where each primitive data structure may be inserted. In this way, the master processing element 502 and slave processing elements 511-514 may operate substantially in parallel to populate the spatial data structure 508 with primitive data structures generated by the primitive generator 504.

Figure 6:
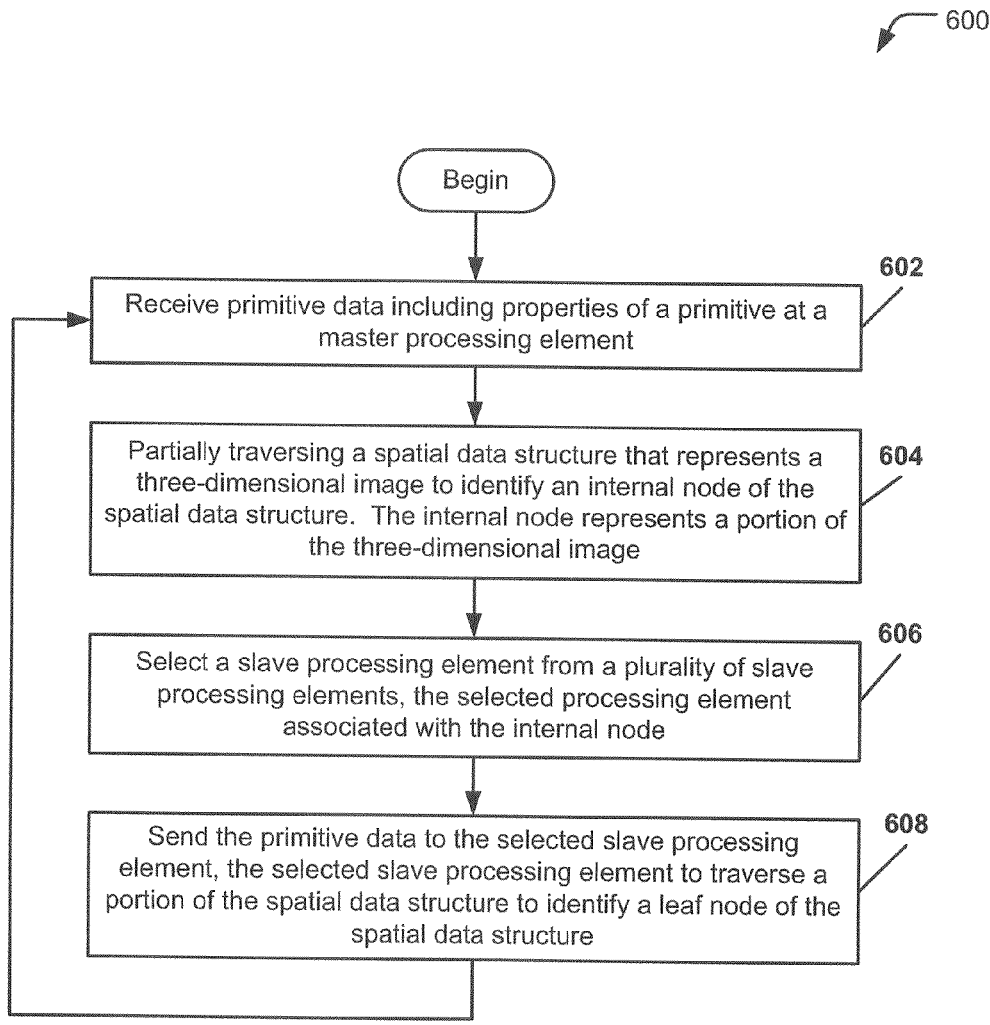
FIG. 6 is a first flow diagram of a method to populate a spatial data structure.

Referring to FIG. 6, a first flow diagram to populate spatial data structure is depicted and generally designated 600. The method of FIG. 6 may be performed by a master processing element such as the master processing element 502 of FIG. 5.

The method begins where a master processing element receives a primitive data structure ("primitive data"), at 602. The primitive data structure may include properties associated with the primitive, such as a location of the primitive in a three-dimensional image. Moving to 604, the master processing element may partially traverse a spatial data structure that represents a three-dimensional image to identify an internal node of the spatial data structure, at 604. The internal node may represent a portion of the three-dimensional image, such as a bounding volume. For example, in FIG. 5, the master processing element 502 may receive the primitive 516 from the primitive generator 504 and partially traverse the spatial data structure 508 based on the location 518. Advancing to 606, a particular slave processing element may be selected from a plurality of slave processing elements. The selected slave processing element may be associated with the portion of the three-dimensional image. Advancing to 606, the master processing element may send the primitive to the selected slave processing element to traverse a portion of the spatial data structure to identify a leaf node of the spatial data structure. For example, in FIG. 5, the master processing element 502 may determine that the first portion 521 is associated with the first slave processing element 511 and send the primitive 516 to the first slave processing element 511. The method repeats by proceeding to 602, where the master processing element receives another primitive data structure.

By sending primitive data structures to slave processing elements, a master processing element may use the slave processing elements to identify leaf nodes of a spatial data structure where the primitive data structures may be inserted. The slave processing elements may determine whether the leaf nodes may be expanded. The slave processing elements may determine whether the expanded leaf nodes will result in the primitives (represented by the primitive data structures in the expanded leaf nodes) entering another portion of the three-dimensional image. The slave processing elements may expand the leaf nodes and send paths to the expanded leaf nodes to the master processing element. In this way, the master processing element and the slave processing elements may operate substantially in parallel to populate the spatial data structure with primitives.

Figure 7:
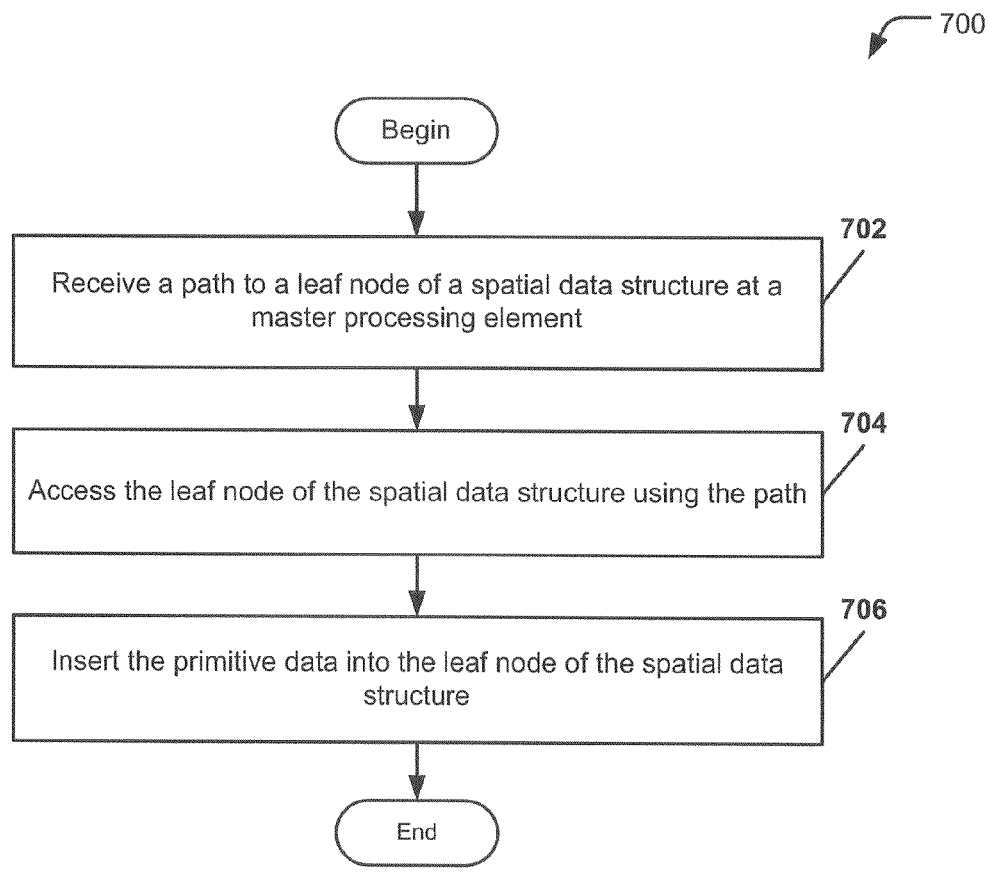
FIG. 7 is a second flow diagram of a method to populate a spatial data structure.

Referring to FIG. 7, a second flow diagram to populate a spatial data structure is depicted and generally designated 700. The method of FIG. 7 may be performed by a master processing element, such as the master processing element 502 of FIG. 5.

The master processing element receives a path from a slave processing element, at 702. For example, in FIG. 5, the master processing element 502 may receive the path 519 from the first slave processing element 511. The master processing element accesses a leaf node of the spatial data structure using the path, at 704. The master processing element inserts the primitive data to the leaf node of the spatial data structure, at 706, and the method ends. For example, in FIG. 5, the master processing element 502 may access a leaf node of the spatial data structure 508 based on the path 519 and insert the primitive data structure 516 into the leaf node.

A master processing element may send primitive data structures to slave processing elements. The slave processing elements may identify leaf nodes of a spatial data structure into the primitive data structures may be inserted. The slave processing elements may send paths to the leaf nodes to the master processing element. The master processing element may receive the paths to the leaf nodes from the slave processing elements, access the leaf nodes of the spatial data structure using the paths, and insert the primitive data structures into the leaf nodes. The master processing element and the slave processing elements may operate substantially in parallel to populate the spatial data structure with primitives.

Figure 8:
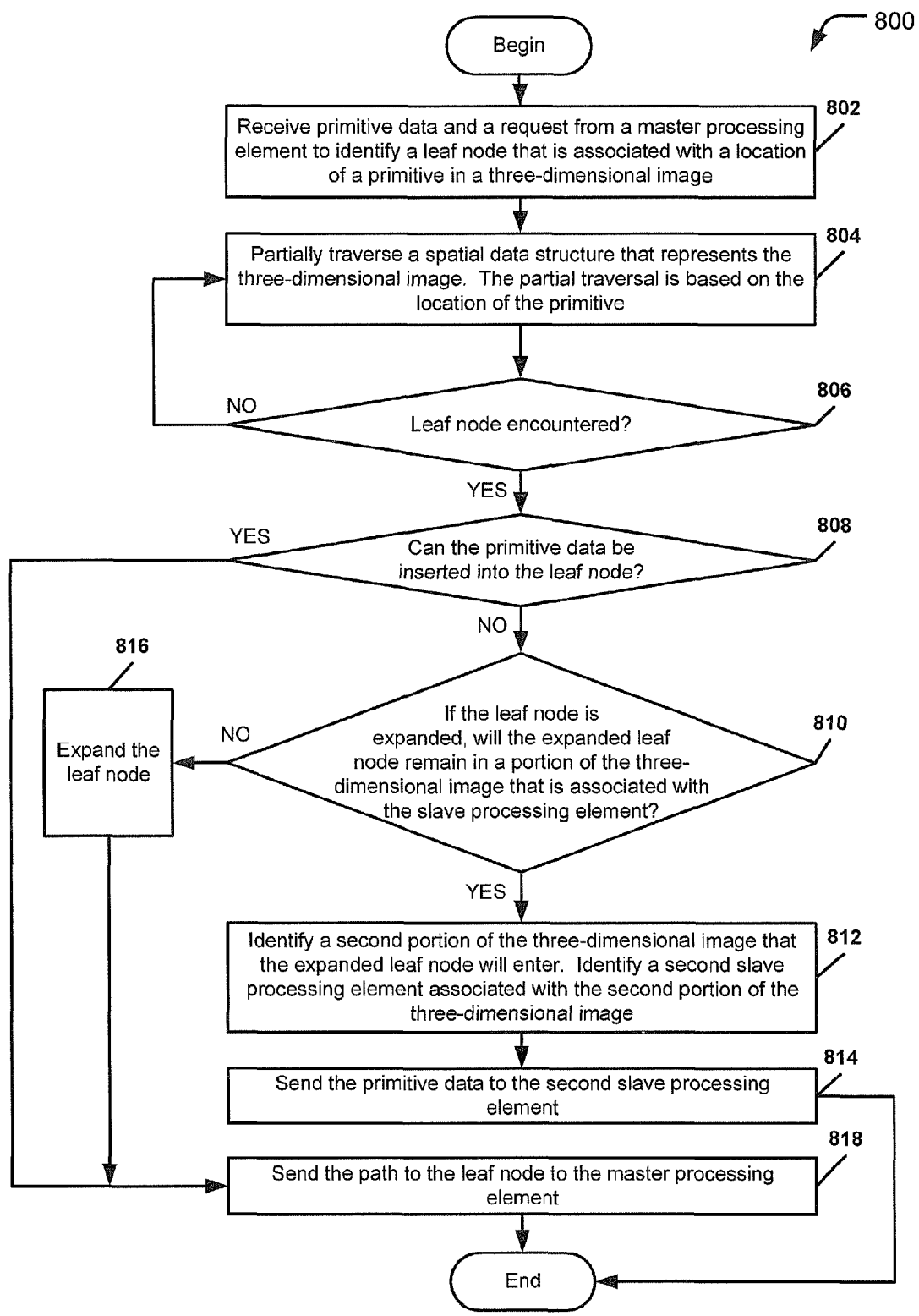
FIG. 8 is a third flow diagram of a method to populate a spatial data structure.

Referring to FIG. 8, a third flow diagram to populate a spatial data structure is depicted and generally designated 800. The method may be performed by a slave processing element, such as the slave processing elements 511-514 of FIG. 5.

A slave processing element receives primitive data (i.e., a primitive data structure that includes properties of a primitive) and a request from a master processing element to identify a leaf node that is associated with a location of a primitive in a three-dimensional image, at 802. The primitive data may include properties of a primitive, including a location of the primitive in a three-dimensional image. Moving to 804, a spatial data structure that represents the three-dimensional image may be partially traversed by the slave processing element. The partial traversal may be based on the location of the primitive. The location of the primitive may be stored in the properties of the primitive data structure that represents the primitive. The spatial data structure may represent the three-dimensional image, with nodes of the spatial data structure corresponding to bounding volumes of the three-dimensional image. Advancing to 806, a determination may be made whether a leaf node of the spatial data structure has been encountered during the traversal. When a leaf node is not encountered, the slave processing element continues to traverse the spatial data structure, at 804.

When a leaf node is encountered at 806, a determination is made whether the primitive data may be inserted into the leaf node, at 808. For example, in FIG. 5, the first slave processing element 511 may traverse the spatial data structure 508 to a leaf node and determine whether a number of primitive data structures in the leaf node satisfy a threshold, i.e., whether the primitive data structure may be inserted into the leaf node. When the primitive data may be inserted into the leaf node, at 808, a path to the leaf node is sent to the master processing element, at 818, and the method ends. For example, in FIG. 5, the first slave processing element 511 may send the path 519 to the master processing element 502.

When the primitive may not be inserted into the leaf node, at 808, a determination may be made whether expanding the leaf node will cause the expanded leaf node to remain in a portion of the three-dimensional image that is associated with the slave processing element, at 810. For example, in FIG. 5, the first slave processing element 511 may determine whether expanding a leaf node will cause the expanded leaf node to remain in the first portion 521. When the expanded leaf node will remain in the portion of the three-dimensional image that is associated with the slave processing element, at 810, the leaf node is expanded, at 816, and a path to the expended leaf node may be sent to the master processing element, at 818. For example, in FIG. 5, the first slave processing element may expand the leaf node and send the path 519 to the master processing element 502. When the expended leaf node does not remain in the portion of the three-dimensional image associated with the slave processing element, at 810, a second portion of the three-dimensional image that the expanded leaf node will enter is identified, at 812. A second slave processing element associated with the second portion of the three-dimensional image is identified. Continuing to 814, the primitive data is sent to the second slave processing element, and the method ends. For example, in FIG. 5, when the first slave processing element 511 determines that the expanded leaf node enters the fourth portion 524, the first slave processing element 511 may send the primitive data structure 516 to the fourth slave processing element 514 that is associated with the fourth portion 524.

Thus, a slave processing element may identify a leaf node of a spatial data structure where a primitive may be inserted. The slave processing element may send a path to the leaf node to a master processing element. The master processing element may insert the primitive into the leaf node. By using multiple slave processing elements to identify the leaf nodes where primitives may be inserted and by using the master processing element to insert the primitives into the leaf nodes, the slave processing elements and the master processing element may operate substantially in parallel to populate a spatial data structure representing a three-dimensional image.

Embodiments may utilize network-on-a-chip (NoC) technology. NoC-based systems may accommodate multiple asynchronous clocking used by many system-on-a-chip designs. As discussed herein, certain embodiments consistent with the disclosure may include microprocessors to execute multiple processing elements in parallel, to provide many of the same performance gains attainable through the use of multiple microprocessors.

Embodiments may also include a number of computer software, firmware, and hardware technologies to facilitate additional parallel processing. In general, routines executed to implement the embodiments of the disclosure, whether implemented in hardware, firmware, in a software operating system, or as a specific application, component, program, engine, process, programmatic tool, object, module, or sequence of instructions, or even a subset thereof, may be referred to herein as an "algorithm," "function," "program code," or simply "program."

Program code may comprise one or more instructions that are resident at various times in various memory and storage devices in a computer, and that, when read and executed by one or more processors in a computer, cause that computer to perform the steps necessary to execute steps or elements of the various embodiments. Embodiments consistent with the principles of the present disclosure may use program code resident at one location or at more than one location.

The various embodiments may be distributed as a program product in a variety of forms, such as non-transitory media, including volatile and non-volatile memory devices, removable disks, hard disk drives, magnetic tape, optical disks (e.g., CD ROMs, DVDs, etc.), among others.

In addition, various program code described hereinafter may be identified based upon the application or engine within which it is implemented in a specific embodiment. However, it should be appreciated that any particular program nomenclature that follows is used merely for convenience, and the various embodiments should not be limited to any specific application or engine identified and/or implied by such nomenclature.

Furthermore, given the variety of ways in which computer programs may be organized into routines, procedures, methods, modules, objects, and the like, as well as the various ways in which program functionality may be allocated among various software layers that are resident within a typical computer (e.g., operating systems, libraries, API's, applications, applets, etc.), it should be appreciated that the various embodiments are not limited to the specific organization and allocation of program functionality described herein.

The various software components and resources illustrated in this disclosure may be implemented in any number of ways, including various computer software applications, routines, components, programs, objects, modules, spatial data structures and programs. The exemplary environments illustrated in this disclosure are not intended to limit the present disclosure. Indeed, those skilled in the art will recognize that other alternative hardware and/or software environments may be used without departing from the scope of this disclosure.

Furthermore, because computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that embodiments of the disclosure are not limited to the specific organization and allocation of program functionality described herein.

The descriptions of the various embodiments are provided to enable a person skilled in the art to make or use the embodiments. Various modifications to these embodiments may be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and features as defined by the following claims.

What is claimed is:

1. A method comprising:
during initial population of a spatial data structure with data usable to render an image of a three-dimensional model:
receiving primitive data from a primitive generator, wherein the primitive data comprises properties of a primitive;
partially traversing the spatial data structure, using a master processing element, to identify an internal node of the spatial data structure, wherein the internal node represents a portion of the three-dimensional model, wherein the internal node is identified based on the primitive data;
selecting a slave processing element from a plurality of slave processing elements, wherein the selected slave processing element is associated with the internal node;
sending the primitive data to the selected slave processing element, wherein the selected slave processing element traverses a portion of the spatial data structure to identify a leaf node of the spatial data structure;
determining whether the leaf node includes a threshold number of primitives, wherein:
when the leaf node does not include the threshold number of primitives, the selected slave processing element sends information identifying the leaf node to the master processing element;
when the leaf node does include the threshold number of primitives, the selected slave processing element determines whether expanding the leaf node will cause the leaf node to extend into a portion of the three-dimensional model that is not associated with the selected slave processing element;
when expanding the leaf node will cause the leaf node to extend into a portion of the three-dimensional model that is not associated with the selected slave processing element, the selected slave processing element selects a second slave processing element to which to send the primitive data, the second slave processing element being a slave processing element associated with the portion of the three-dimensional model into which the leaf node extends when expanded and being the slave processing element that is to send a path of the leaf node to the master processing element as information identifying the leaf node; and when expanding the leaf node will not cause the leaf node to extend into a portion of the three-dimensional model that is not associated with the selected slave processing element, the selected slave processing element expands the leaf node and sends a path of the leaf node to the master processing element as the information identifying the leaf node;

receiving information identifying the leaf node from one of the plurality of slave processing elements; and inserting the primitive data into the leaf node.

2. The method of claim 1, wherein the spatial data structure is partially traversed by the master processing element based on properties associated with the primitive data.

3. The method of claim 1, wherein the portion of the spatial data structure traversed by the selected slave processing element corresponds to the portion of the three-dimensional model.

4. The method of claim 1, wherein the primitive data describes the properties of one or more of a triangle, a rectangle, a square, a cylinder, or any combination thereof.

5. The method of claim 1, wherein selecting the slave processing element comprises selecting the slave processing element associated with the portion of the three-dimensional model.

6. The method of claim 1, wherein inserting the primitive data into the leaf node of the spatial data structure comprises modifying the leaf node to indicate presence of the primitive specified by the primitive data at a location of the three-dimensional model that corresponds to the leaf node.

7. A computer program product comprising a non-transitory computer usable medium having computer usable program code embodied therewith, the computer usable program code executable by a processor, during initial population of a spatial data structure with data usable to render an image of a three-dimensional model, to:

receive primitive data from a primitive generator and request, using a master processing element, a selected slave processing element to identify a leaf node that is associated with a location of a primitive in the three-dimensional model, wherein the primitive data comprising properties of the primitive, wherein the selected slave processing element, after identifying a leaf node based on the primitive data, determines whether the leaf node includes a threshold number of primitives, and wherein:

when the leaf node does not include the threshold number of primitives, the selected slave processing element sends information identifying the leaf node to the master processing element;

when the leaf node does include the threshold number of primitives, the selected slave processing element determines whether expanding the leaf node will cause the leaf node to extend into a portion of the three-dimensional model that is not associated with the selected slave processing element;

when expanding the leaf node will cause the leaf node to extend into a portion of the three-dimensional model that is not associated with the selected slave processing element, the selected slave processing element selects a second slave processing element to which to send the primitive data, the second slave processing element being a slave processing element associated with the portion of the three-dimensional model into which the leaf node extends when expanded and being the slave processing element that is to send a path of the leaf node to the master processing element as information identifying the leaf node ; and when expanding the leaf node will not cause the leaf node to extend into a portion of the three-dimensional model that is not associated with the selected slave processing element, the selected slave processing element expands the leaf node and sends a path of the leaf node to the master processing element as the information identifying the leaf node.

8. The computer program product of claim 7, wherein the expanded leaf node is accessed using the path and to insert the primitive data therein.

9. A system, comprising:

a master processing element operable, during initial population of a spatial data structure with data usable to:

render an image of a three-dimensional model;

receive primitive data comprising properties of a primitive from a primitive generator, partially traverse the spatial data structure to identify an internal node of the spatial data structure based on the primitive data;

select from a plurality of slave processing elements a slave processing element associated with the internal node;

send the primitive data to the selected slave processing element with a request that the selected slave processing element traverse a portion of the spatial data structure to identify a leaf node of the spatial data structure, wherein the selected slave processing element, after identifying a leaf node based on the primitive data, determines whether the leaf node includes a threshold number of primitives, and wherein:

when the leaf node does not include the threshold number of primitives, the selected slave processing element sends information identifying the leaf node to the master processing element;

when the leaf node does include the threshold number of primitives, the selected slave processing element determines whether expanding the leaf node will cause the leaf node to extend into a portion of the three-dimensional model that is not associated with the selected slave processing element;

when expanding the leaf node will cause the leaf node to extend into a portion of the three-dimensional model that is not associated with the selected slave processing element, the selected slave processing element selects a second slave processing element to which to send the primitive data, the second slave processing element being a slave processing element associated with the portion of the three-dimensional model into which the leaf node extends when expanded and being the slave processing element that is to send a path of the leaf node to the master processing element as information identifying the leaf node ; and when expanding the leaf node will not cause the leaf node to extend into a portion of the three-dimensional model that is not associated with the selected slave processing element, the selected slave processing element expands the leaf node and sends a path of the leaf node to the master processing element as the information identifying the leaf node;

receive information identifying the leaf node from one of the plurality of slave processing elements; and insert the primitive data into the leaf node.

10. The system of claim 9, wherein the master processing element is further operable to access the expanded leaf node using the path.

11. The system of claim 9, wherein a network on a chip executes, in parallel, the master processing element and at least some of the plurality of slave processing elements.

12. The system of claim 9, wherein the master processing element sends the primitive data to the selected slave processing element via an inter-processing element communication mechanism.

* * * * *